US012706057B2

(12) United States Patent
Kim et al.

(10) Patent No.: US 12,706,057 B2
(45) Date of Patent: Aug. 11, 2026

(54) DRIVER AND DISPLAY DEVICE

(71) Applicant: Samsung Display Co., Ltd., Yongin-Si (KR)

(72) Inventors: Soon-Dong Kim, Yongin-si (KR); Taehoon Kim, Yongin-si (KR)

(73) Assignee: Samsung Display Co., Ltd., Yogin's (KR)

( * ) Notice: Subject to any disclaimer, the term of this patent is extended or adjusted under 35 U.S.C. 154(b) by 0 days.

(21) Appl. No.: 18/959,662

(22) Filed: Nov. 26, 2024

(65) Prior Publication Data

US 2025/0232733 A1 Jul. 17, 2025

(30) Foreign Application Priority Data

Jan. 16, 2024 (KR) ........................ 10-2024-0006644

(51) Int. Cl.

*G09G 3/3275* (2016.01)
*G09G 3/32* (2016.01)
*G09G 3/3266* (2016.01)

(52) U.S. Cl.

CPC ............. *G09G 3/3275* (2013.01); *G09G 3/32* (2013.01); *G09G 3/3266* (2013.01); *G09G 2310/0267* (2013.01); *G09G 2310/0275* (2013.01); *G09G 2310/0286* (2013.01); *G09G 2310/08* (2013.01); *G09G 2330/021* (2013.01)

(58) Field of Classification Search

CPC ......... G09G 2310/0286; G09G 3/3677; G09G 3/3266; G09G 2310/08; G09G 2300/0842; G09G 2300/0408; G09G 2310/0267; G09G 3/20; G09G 3/3233; G09G 2310/0291; G09G 2330/021; G09G 2300/0861; G09G 3/3688; G09G 3/3648; G09G 2310/0289; G09G 3/3696; G09G 3/3674

See application file for complete search history.

(56) References Cited

U.S. PATENT DOCUMENTS

| | | | | |
|---|---|---|---|---|
| 11,423,843 | B2 | 8/2022 | Kim et al. | |
| 11,600,231 | B2 | 3/2023 | Kim et al. | |
| 2003/0234671 | A1* | 12/2003 | Akiyoshi | H03K 5/06 327/172 |

(Continued)

FOREIGN PATENT DOCUMENTS

| | | | |
|---|---|---|---|
| KR | 10-2017-0060953 | A | 6/2017 |
| KR | 10-2022-0000023 | A | 1/2022 |

(Continued)

*Primary Examiner* — Sujit Shah

(74) *Attorney, Agent, or Firm* — Innovation Counsel LLP

(57) ABSTRACT

At least one stage of a driver includes an input circuit transferring an input signal to a first node in response to at least one of a clock signal and an inverted clock signal, a holding capacitor holding a voltage of the first node, a first inverter generating a voltage of a second node by inverting the voltage of the first node, a second inverter generating a voltage of a third node by inverting the voltage of the second node, a third inverter generating a carry signal by inverting the voltage of the second node, and an output control circuit selectively outputting the voltage of the third node as an output signal in response to an output enable signal. At least one of the first, second, third inverters, and the output control circuit includes a PMOS transistor and an NMOS transistor that are connected in series.

17 Claims, 17 Drawing Sheets

(56) References Cited

U.S. PATENT DOCUMENTS

| | | | | |
|---|---|---|---|---|
| 2006/0068536 | A1* | 3/2006 | Yamazaki | H10D 86/40 257/E27.111 |
| 2016/0117987 | A1* | 4/2016 | Byun | G09G 3/3266 345/205 |
| 2017/0148392 | A1 | 5/2017 | Kim | |
| 2017/0287424 | A1* | 10/2017 | Wu | G09G 3/3266 |
| 2021/0012708 | A1* | 1/2021 | Yang | G09G 3/3225 |
| 2021/0027707 | A1* | 1/2021 | Park | G09G 3/035 |
| 2021/0118375 | A1* | 4/2021 | Yang | G09G 3/3266 |
| 2021/0366352 | A1* | 11/2021 | Zou | G09G 3/2092 |
| 2021/0407427 | A1 | 12/2021 | Lee et al. | |
| 2022/0375412 | A1 | 11/2022 | Kim et al. | |
| 2023/0006013 | A1* | 1/2023 | Choi | H10K 59/131 |
| 2024/0194153 | A1 | 6/2024 | Kim et al. | |

FOREIGN PATENT DOCUMENTS

| | | |
|---|---|---|
| KR | 10-2022-0001037 A | 1/2022 |
| KR | 10-2022-0068326 A | 5/2022 |

* cited by examiner

DRIVER AND DISPLAY DEVICE

CROSS-REFERENCE TO RELATED APPLICATION(S)

This application claims priority under 35 U.S.C. § 119 to Korean Patent Application No. 10-2024-0006644, filed on Jan. 16, 2024 in the Korean Intellectual Property Office (KIPO), the content of which is herein incorporated by reference in its entirety.

BACKGROUND

1. Field

Embodiments of the present inventive concept relate to a display device, and more particularly to a driver including complementary metal-oxide-semiconductor (CMOS) transistors, and a display device including the driver.

2. Description of the Related Art

A driver (e.g., a gate driver and/or an emission driver) of a display device may sequentially provide signals (e.g., gate signals and/or emission signals) to pixels of a display panel on a row-by-row basis. To sequentially provide the signals on the row-by-row basis, the driver may be implemented in a form of a shift register including a plurality of stages.

In general, each stage of the driver may include only a single type of transistor, for example a p-type metal-oxide-semiconductor (PMOS) transistor. In a case where each stage includes only the PMOS transistor, to output an output signal having a low voltage level, a bootstrapping operation that decreases a voltage of an internal node of the stage to a voltage level lower than the low voltage level should be performed.

SUMMARY

Some embodiments provide a driver in which each stage includes complementary metal-oxide-semiconductor (CMOS) transistors.

Some embodiments provide a display device including a driver in which each stage includes CMOS transistors.

According to embodiments, there is provided a driver including a plurality of stages. At least one stage of the plurality of stages includes an input circuit configured to transfer an input signal to a first node in response to at least one of a clock signal and an inverted clock signal, a holding capacitor configured to hold a voltage of the first node, a first inverter configured to generate a voltage of a second node by inverting the voltage of the first node, a second inverter configured to generate a voltage of a third node by inverting the voltage of the second node, a third inverter configured to generate a carry signal by inverting the voltage of the second node, and an output control circuit configured to selectively output the voltage of the third node as an output signal in response to an output enable signal. At least one of the first inverter, the second inverter, the third inverter and the output control circuit includes a p-type metal-oxide-semiconductor (PMOS) transistor and an n-type metal-oxide-semiconductor (NMOS) transistor that are connected in series.

In embodiments, a first active region of the PMOS transistor may include a material different from a material of a second active region of the NMOS transistor.

In embodiments, the first active region of the PMOS transistor may include polycrystalline silicon, and the second active region of the NMOS transistor may include an oxide semiconductor, an organic semiconductor or amorphous silicon.

In embodiments, the NMOS transistor may include a top gate located above the second active region, and a bottom gate located below the second active region. A low gate voltage may be applied to a terminal of the NMOS transistor, and a second low gate voltage lower than the low gate voltage may be applied to the bottom gate of the NMOS transistor.

In embodiments, the output control circuit may output a low gate voltage as the output signal while the output enable signal has a high level, and may output the voltage of the third node as the output signal while the output enable signal has a low level.

In embodiments, the output control circuit may include a first PMOS transistor including a gate which receives the output enable signal, a first terminal connected to the third node, and a second terminal connected to an output node at which the output signal is output, and a first NMOS transistor including a gate which receives the output enable signal, a first terminal connected to a line which transfers a low gate voltage, and a second terminal connected to the output node.

In embodiments, the input circuit may include at least one of a second PMOS transistor including a gate which receives the inverted clock signal, a first terminal which receives the input signal, and a second terminal connected to the first node, and a second NMOS transistor including a gate which receives the clock signal, a first terminal which receives the input signal, and a second terminal connected to the first node.

In embodiments, the holding capacitor may include a first electrode connected to a line which transfers a high gate voltage, and a second electrode connected to the first node.

In embodiments, the first inverter may include a third PMOS transistor including a gate connected to the first node, a first terminal connected to a line which transfers a high gate voltage, and a second terminal connected to the second node, and a third NMOS transistor including a gate connected to the first node, a first terminal connected to a line which transfers a low gate voltage, and a second terminal connected to the second node.

In embodiments, the second inverter may include a fourth PMOS transistor including a gate connected to the second node, a first terminal connected to a line which transfers a high gate voltage, and a second terminal connected to the third node, and a fourth NMOS transistor including a gate connected to the second node, a first terminal connected to a line which transfers a low gate voltage, and a second terminal connected to the third node.

In embodiments, the third inverter may include a fifth PMOS transistor including a gate connected to the second node, a first terminal connected to a line which transfers a high gate voltage, and a second terminal connected to a carry node at which the carry signal is output, and a fifth NMOS transistor including a gate connected to the second node, a first terminal connected to a line which transfers a low gate voltage, and a second terminal connected to the carry node.

In embodiments, the at least one stage may further include a sixth PMOS transistor including a gate which receives a global reset signal, a first terminal connected to a line which transfers a high gate voltage, and a second terminal connected to the first node.

In embodiments, the at least one stage may further include a PMOS boosting buffer, wherein the voltage of the first node has a low level, and the PMOS boosting buffer is configured to output a low gate voltage to the third node.

In embodiments, the PMOS boosting buffer may include a boosting capacitor including a first electrode connected to a carry node at which the carry signal is output, and a second electrode connected to a fourth node, a seventh PMOS transistor including a gate connected to a line which transfers the low gate voltage, a first terminal connected to the first node, and a second terminal connected to the fourth node, and an eighth PMOS transistor including a gate connected to the fourth node, a first terminal connected to the third node, and a second terminal connected to the line which transfers the low gate voltage.

In embodiments, the output control circuit may output the voltage of the third node as the output signal while the output enable signal has a high level, and may output a low gate voltage as the output signal while the output enable signal has a low level.

In embodiments, the output control circuit may include a first NMOS transistor including a gate which receives the output enable signal, a first terminal connected to the third node, and a second terminal connected to an output node at which the output signal is output, and a first PMOS transistor including a gate which receives the output enable signal, a first terminal connected to a line which transfers a low gate voltage, and a second terminal connected to the output node.

According to embodiments, there is provided a driver including a plurality of stages. At least one stage of the plurality of stages includes a first PMOS transistor including a gate which receives an output enable signal, a first terminal connected to a third node, and a second terminal connected to an output node, a first NMOS transistor including a gate which receives the output enable signal, a first terminal connected to a line which transfers a low gate voltage, and a second terminal connected to the output node, a second PMOS transistor including a gate which receives an inverted clock signal, a first terminal which receives an input signal, and a second terminal connected to a first node, a second NMOS transistor including a gate which receives a clock signal, a first terminal which receives the input signal, and a second terminal connected to the first node, a holding capacitor including a first electrode connected to a line which transfers a high gate voltage, and a second electrode connected to the first node, a third PMOS transistor including a gate connected to the first node, a first terminal connected to the line which transfers the high gate voltage, and a second terminal connected to a second node, a third NMOS transistor including a gate connected to the first node, a first terminal connected to the line which transfers the low gate voltage, and a second terminal connected to the second node, a fourth PMOS transistor including a gate connected to the second node, a first terminal connected to the line which transfers the high gate voltage, and a second terminal connected to the third node, a fourth NMOS transistor including a gate connected to the second node, a first terminal connected to the line which transfers the low gate voltage, and a second terminal connected to the third node, a fifth PMOS transistor including a gate connected to the second node, a first terminal connected to the line which transfers the high gate voltage, and a second terminal connected to a carry node, a fifth NMOS transistor including a gate connected to the second node, a first terminal connected to the line which transfers the low gate voltage, and a second terminal connected to the carry node, and a sixth PMOS transistor including a gate which receives a global reset signal, a first terminal connected to the line which transfers the high gate voltage, and a second terminal connected to the first node.

In embodiments, the at least one stage may further include a boosting capacitor including a first electrode connected to the carry node, and a second electrode connected to a fourth node, a seventh PMOS transistor including a gate connected to the line which transfers the low gate voltage, a first terminal connected to the first node, and a second terminal connected to the fourth node, and an eighth PMOS transistor including a gate connected to the fourth node, a first terminal connected to the third node, and a second terminal connected to the line which transfers the low gate voltage.

According to embodiments, there is provided a display device including a display panel including a plurality of pixels, a data driver configured to provide data signals to the plurality of pixels, a gate driver configured to provide gate signals to the plurality of pixels, an emission driver configured to provide emission signals to the plurality of pixels, and a controller configured to control the data driver, the gate driver and the emission driver. At least one of the gate driver and the emission driver includes a plurality of stages. At least one stage of the plurality of stages includes an input circuit configured to transfer an input signal to a first node in response to at least one of a clock signal and an inverted clock signal, a holding capacitor configured to hold a voltage of the first node, a first inverter configured to generate a voltage of a second node by inverting the voltage of the first node, a second inverter configured to generate a voltage of a third node by inverting the voltage of the second node, a third inverter configured to generate a carry signal by inverting the voltage of the second node, and an output control circuit configured to selectively output the voltage of the third node as an output signal in response to an output enable signal. At least one of the first inverter, the second inverter, the third inverter and the output control circuit includes a p-type metal-oxide-semiconductor (PMOS) transistor and an n-type metal-oxide-semiconductor (NMOS) transistor that are connected in series.

In embodiments, the display panel may include a first panel region driven at a first driving frequency, and a second panel region driven at a second driving frequency lower than the first driving frequency. In a first frame period, the controller may generate the output enable signal having a first level during a first time within the first frame period allocated to the first panel region and a second time within the first frame period allocated to the second panel region such that the plurality of stages outputs output signals to both of the first panel region and the second panel region. In a second frame period, the controller may generate the output enable signal having the first level during a third time within the second frame period allocated to the first panel region and a second level different from the first level during a fourth time within the second frame period allocated to the second panel region such that the plurality of stages outputs the output signals to the first panel region and does not output the output signals to the second panel region.

As described above, in a driver and a display device according to embodiments, at least one stage may include an input circuit, a first inverter, a second inverter, a third inverter and an output control circuit, and at least one of the first inverter, the second inverter, the third inverter and the output control circuit may include both of a PMOS transistor and an NMOS transistor, or CMOS transistors. Accordingly, a bootstrapping operation may not be desired or performed in the stage, and power consumption of the driver and the display device may be reduced.

Further, in the driver and the display device according to embodiments, the output control circuit may selectively output an output signal in response to an output enable signal. Accordingly, the driver according to embodiments may be suitable for a display device that performs a multi-frequency driving (MFD) operation.

BRIEF DESCRIPTION OF THE DRAWINGS

Illustrative, non-limiting embodiments will be more clearly understood from the following detailed description in conjunction with the accompanying drawings.

DETAILED DESCRIPTION OF EMBODIMENTS

Figure 1:
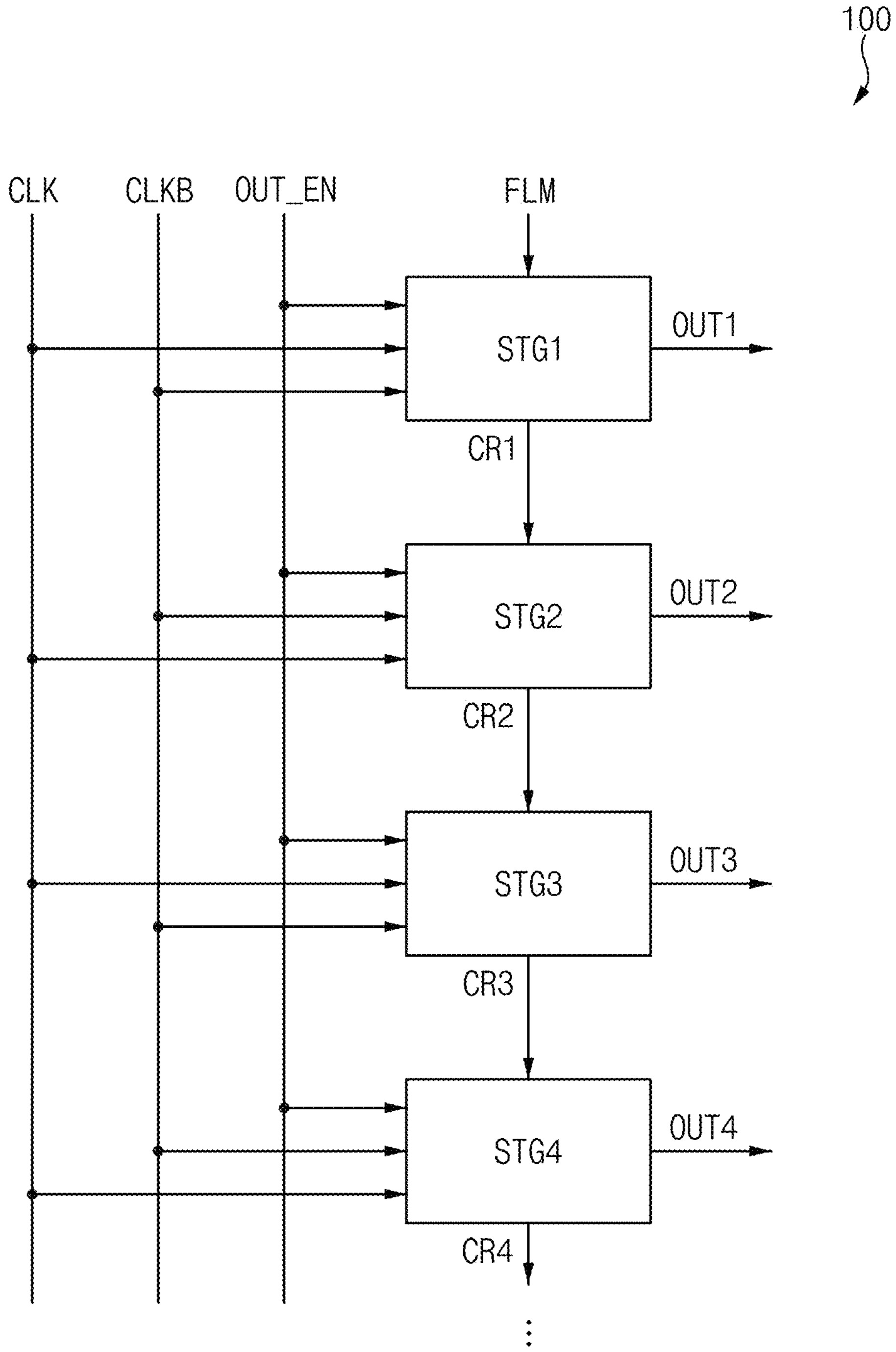
FIG. 1 is a block diagram illustrating a driver according to embodiments.

The embodiments are described more fully hereinafter with reference to the accompanying drawings. Like or similar reference numerals refer to like or similar elements throughout.

FIG. 1 is a block diagram illustrating a driver 100 according to embodiments.

Referring to FIG. 1, the driver 100 according to embodiments may include a plurality of stages STG1, STG2, STG3, STG4, etc. The plurality of stages STG1, STG2, STG3, STG4, etc. may sequentially generate carry signals CR1, CR2, CR3, CR4, etc. based on a start signal FLM, a clock signal CLK and an inverted clock signal CLKB, and may selectively output output signals OUT1, OUT2, OUT3, OUT4, etc. based on an output enable signal OUT_EN. In some embodiments, the driver 100 may be included in a display device, and may be formed in a display panel of the display device. For example, the driver 100 may be integrated or formed on a substrate of the display panel, but is not limited thereto. In other embodiments, the driver 100 may be implemented as an integrated circuit.

The first stage STG1 may receive the start signal FLM as an input signal, and each of the subsequent stages STG2, STG3, STG4, etc. may receive a carry signal of a previous stage as the input signal. For example, the second stage STG2 may receive the first carry signal CR1 of the first stage STG1 as the input signal, the third stage STG3 may receive the second carry signal CR2 of the second stage STG2 as the input signal, and the fourth stage STG4 may receive the third carry signal CR3 of the third stage STG3 as the input signal.

In some embodiments, each odd-numbered stage STG1, STG3, etc. may start outputting the carry signal CR1, CR3, etc. when the clock signal CLK has a high level, and each even-numbered stage STG2, STG4, etc. may start outputting the carry signal CR2, CR4, etc. when the inverted clock signal CLKB has the high level. For example, when the clock signal CLK becomes the high level after the start signal FLM becomes the high level, the first stage STG1 may start outputting the first carry signal CR1 having the high level. When the inverted clock signal CLKB becomes the high level after the first carry signal CR1 becomes the high level, the second stage STG2 may start outputting the second carry signal CR2 having the high level. When the clock signal CLK becomes the high level after the second carry signal CR2 becomes the high level, the third stage STG3 may start outputting the third carry signal CR3 having the high level. When the inverted clock signal CLKB becomes the high level after the third carry signal CR3 becomes the high level, the fourth stage STG4 may start outputting the fourth carry signal CR4 having the high level. In this manner, the plurality of stages STG1, STG2, STG3, STG4, etc. may sequentially output the carry signals CR1, CR2, CR3, CR4, etc. by delaying or shifting the carry signals CR1, CR2, CR3, CR4, etc. by half a period of the clock signal CLK.

Further, each stage STG1, STG2, STG3, STG4, etc. may selectively output its output signal having the high level according to a level of the output enable signal OUT_EN while outputting its carry signal having the high level. For example, while the first carry signal CR1 having the high level is output, the first stage STG1 may output a first output signal OUT1 having the high level in response to the output enable signal OUT_EN having a first level (e.g., a low level in an example of FIG. 5, or a high level in an example of FIG. 11), and may not output the first output signal OUT1 having the high level in response to the output enable signal OUT_EN having a second level (e.g., a high level in the example of FIG. 5, or a low level in the example of FIG. 11). Further, while the second carry signal CR2 having the high level is output, the second stage STG2 may output a second output signal OUT2 having the high level in response to the output enable signal OUT_EN having the first level, and may not output the second output signal OUT2 having the high level in response to the output enable signal OUT_EN having the second level. Thus, the respective stages STG1, STG2, STG3, STG4, etc. may selectively output the output signals OUT1, OUT2, OUT3, OUT4, etc. according to the output enable signal OUT_EN applied to the plurality of stages STG1, STG2, STG3, STG4, etc. Accordingly, the driver 100 according to embodiments may provide the output signals OUT1, OUT2, OUT3, OUT4, etc. at different driving frequencies to a plurality of pixel rows, and thus may be suitable for a display device that performs a multi-frequency driving (MFD) operation.

Figure 2:
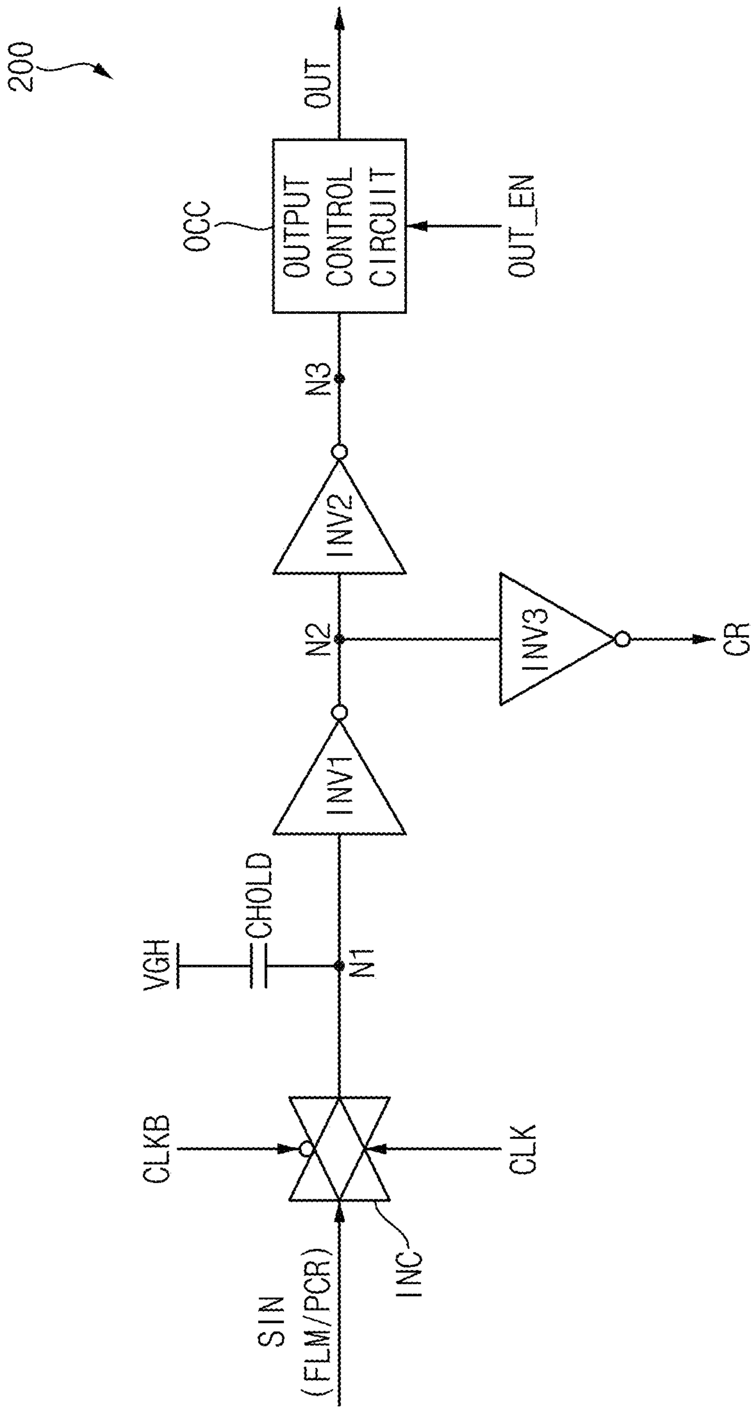
FIG. 2 is a block diagram illustrating a stage of a driver according to embodiments.
Figure 3:
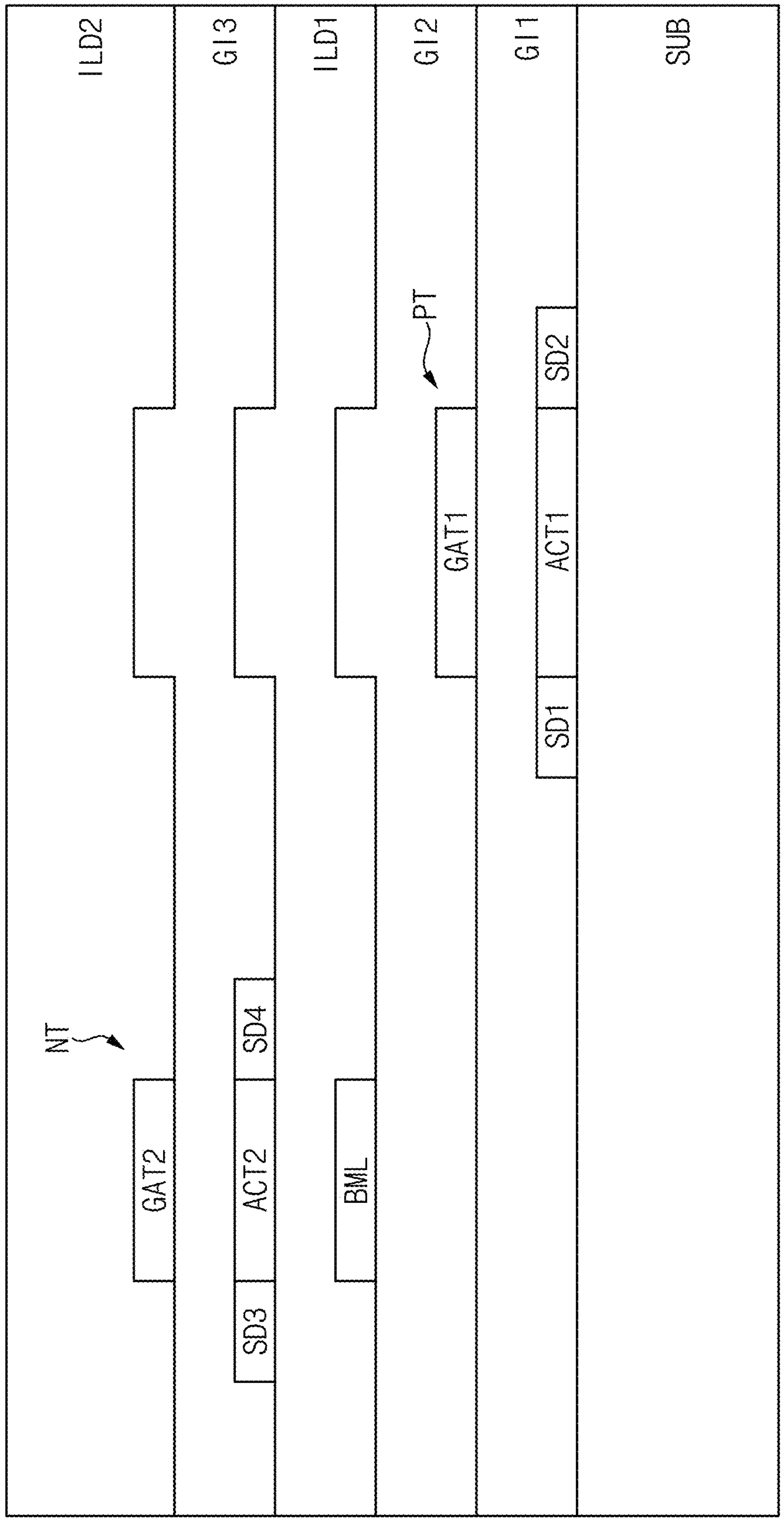
FIG. 3 is a cross-sectional diagram illustrating an example of a PMOS transistor and an NMOS transistor included in a stage of FIG. 2.

FIG. 2 is a block diagram illustrating a stage 200 of a driver according to embodiments. FIG. 3 is a cross-sectional diagram illustrating an example of a PMOS transistor PT and an NMOS transistor NT included in a stage 200 of FIG. 2.

Referring to FIG. 2, the at least one stage 200 of a driver according to embodiments may include an input circuit INC, a holding capacitor CHOLD, a first inverter INV1, a second inverter INV2, a third inverter INV3 and an output control circuit OCC.

The input circuit INC may transfer an input signal SIN to a first node N1 in response to at least one of a clock signal CLK and an inverted clock signal CLKB. The input signal SIN may be a start signal FLM in a case where the stage 200 is a first stage, or may be a carry signal PCR of a previous stage in a case where the stage 200 is a subsequent stage. In some embodiments, the input circuit INC may be implemented as, but is not limited to, a complementary metal-oxide-semiconductor (CMOS) transmission gate including a p-type metal-oxide-semiconductor (PMOS) transistor and an n-type metal-oxide-semiconductor (NMOS) transistor connected in parallel. In other embodiments, the input circuit INC may include only the PMOS transistor, or may include only the NMOS transistor. The holding capacitor CHOLD may maintain a voltage of the first node N1.

The first inverter INV1 may generate a voltage of a second node N2 by inverting a voltage of the first node N1. The second inverter INV2 may generate a voltage of a third node N3 by inverting the voltage of the second node N2. The third inverter INV3 may generate a carry signal CR by inverting the voltage of the second node N2. Thus, when the first node N1 has a high gate voltage VGH, the voltage of the third node N3 may have a high level, and the carry signal CR having the high level may be output.

The output control circuit OCC may selectively output the voltage of the third node N3 as an output signal OUT in response to the output enable signal OUT_EN. In some embodiments, the output control circuit OCC may output the output signal OUT having a low level while the output enable signal OUT_EN has the high level, and may output the voltage of the third node N3 as the output signal OUT while the output enable signal OUT_EN has the low level. In other embodiments, the output control circuit OCC may output the voltage of the third node N3 as the output signal OUT while the output enable signal OUT_EN has the high level, and may output the output signal OUT having the low level while the output enable signal OUT_EN has the low level.

In each stage 200 of the driver according to embodiments, at least one of the first inverter INV1, the second inverter INV2, the third inverter INV3 and the output control circuit OCC may include a PMOS transistor and an NMOS transistor that are connected in series. In some embodiments, a first active region of the PMOS transistor may include a material different from a material of a second active region of the NMOS transistor. Further, in some embodiments, the NMOS transistor may include a top gate located above the second active region and a bottom gate located below the second active region.

For example, as illustrated in FIG. 3, a first source/drain region SD1, the first active region ACT1 and a second source/drain region SD2 of the PMOS transistor PT may be formed on a substrate SUB of a display panel. In some embodiments, a buffer layer may be further formed between the substrate SUB and the first active region ACT1 to prevent impurities, but embodiments are not limited thereto. The first active region ACT1 of the PMOS transistor PT may include polycrystalline silicon, for example, low temperature polycrystalline silicon (LTPS). Further, the first and second source/drain regions SD1 and SD2 may be p+ doped regions, and may serve as a source and a drain of the PMOS transistor PT, respectively. A first gate insulating layer GI1 may be formed on the first source/drain region SD1, the first active region ACT1 and the second source/drain region SD2. For example, the first gate insulating layer GI1 may include silicon oxide, but is not limited thereto. Further, a gate GAT1 of the PMOS transistor PT may be formed on the first gate insulating layer GI1. For example, the gate GAT1 of the PMOS transistor PT may include a metal material such as molybdenum, but is not limited thereto. A second gate insulating layer GI2 may be formed on the gate GAT1 of the PMOS transistor PT. For example, the second gate insulating layer GI2 may include silicon nitride, but is not limited thereto.

Further, the bottom gate BML of the NMOS transistor NT may be formed on the second gate insulating layer GI2. For example, the bottom gate BML may include a metal material such as molybdenum, but is not limited thereto. In some embodiments, a terminal (e.g., a third source/drain region SD3 or a fourth source/drain region SD4) of the NMOS transistor NT may receive a low gate voltage that is a low voltage of the input signal SIN, the clock signal CLK, the inverted clock signal CLKB, the carry signal CR and the output signal OUT, and the bottom gate BML of the NMOS transistor NT may receive a second low gate voltage lower than the low gate voltage. In this case, a threshold voltage of the NMOS transistor NT may be increased, and thus a leakage current through the NMOS transistor NT may be reduced. A first interlayer insulating layer ILD1 may be formed on the bottom gate BML. For example, the first interlayer insulating layer ILD1 may include silicon oxide or silicon nitride, but is not limited thereto.

A third source/drain region SD3, the second active region ACT2 and a fourth source/drain region SD4 of the NMOS transistor NT may be formed on the first interlayer insulating layer ILD1. The second active region ACT2 of the NMOS transistor NT may include a material different from the material of the first active region ACT1 of the PMOS transistor PT. For example, the second active region ACT2 of the NMOS transistor NT may include an oxide semiconductor, an organic semiconductor, amorphous silicon, etc. That is, in some embodiments, the first active region ACT1 of the PMOS transistor PT may include polycrystalline silicon, and the second active region ACT2 of the NMOS transistor NT may include an oxide semiconductor, an organic semiconductor or amorphous silicon. Further, in some embodiments, as illustrated in FIG. 3, the first active region ACT1 of the PMOS transistor PT and the second active region ACT2 of the NMOS transistor NT may be formed in different layers located at different heights from the substrate SUB of the display panel. The third and fourth source/drain regions SD3 and SD4 may be n+ doped regions, and may serve as a source and a drain of the NMOS transistor NT, respectively. A third gate insulating layer GI3 may be formed on the third source/drain region SD3, the second active region ACT2 and the fourth source/drain region SD4. For example, the third gate insulating layer GI3 may include silicon nitride, but is not limited thereto. Further, the top gate GAT2 of the NMOS transistor NT may be formed on the third gate insulating layer GI3. For example, the top gate GAT2 of the NMOS transistor NT may include a metal material such as molybdenum or titanium, but is not limited thereto. A second interlayer insulating layer ILD2 may be formed on the top gate GAT2 of the NMOS transistor NT. For example, the second interlayer insulating layer ILD2 may include silicon oxide or silicon nitride, but is not limited thereto.

Each stage of a conventional driver may include only a single type of transistor. For example, in a case where each stage includes only a PMOS transistor, to output an output signal having a low voltage level, a bootstrapping operation that decreases a voltage of an internal node of the stage to a voltage level lower than the low voltage level should be performed. Further, in a case where each stage includes only an NMOS transistor, to output an output signal having a high voltage level, a bootstrapping operation that increases a voltage of an internal node of the stage to a voltage level higher than the high voltage level should be performed.

However, as described above, in each stage 200 of the driver according to embodiments, at least one of the first inverter INV1, the second inverter INV2, the third inverter INV3 and the output control circuit OCC may include both of the PMOS transistor PT and the NMOS transistor NT, or CMOS transistors. Further, in some embodiments, the PMOS transistor PT may output a high voltage (e.g., the high gate voltage VGH), and the NMOS transistor NT may output a low voltage (e.g., the low gate voltage). Accordingly, the bootstrapping operation may not be desired or performed in the stage 200, and power consumption of the driver and a display device including the driver may be reduced.

Further, in the stage 200 of the driver according to embodiments, the output control circuit OCC may selectively output the output signal OUT in response to the output enable signal OUT_EN. Accordingly, the driver according to embodiments may be suitable for a display device that performs a multi-frequency driving (MFD) operation.

Figure 4:
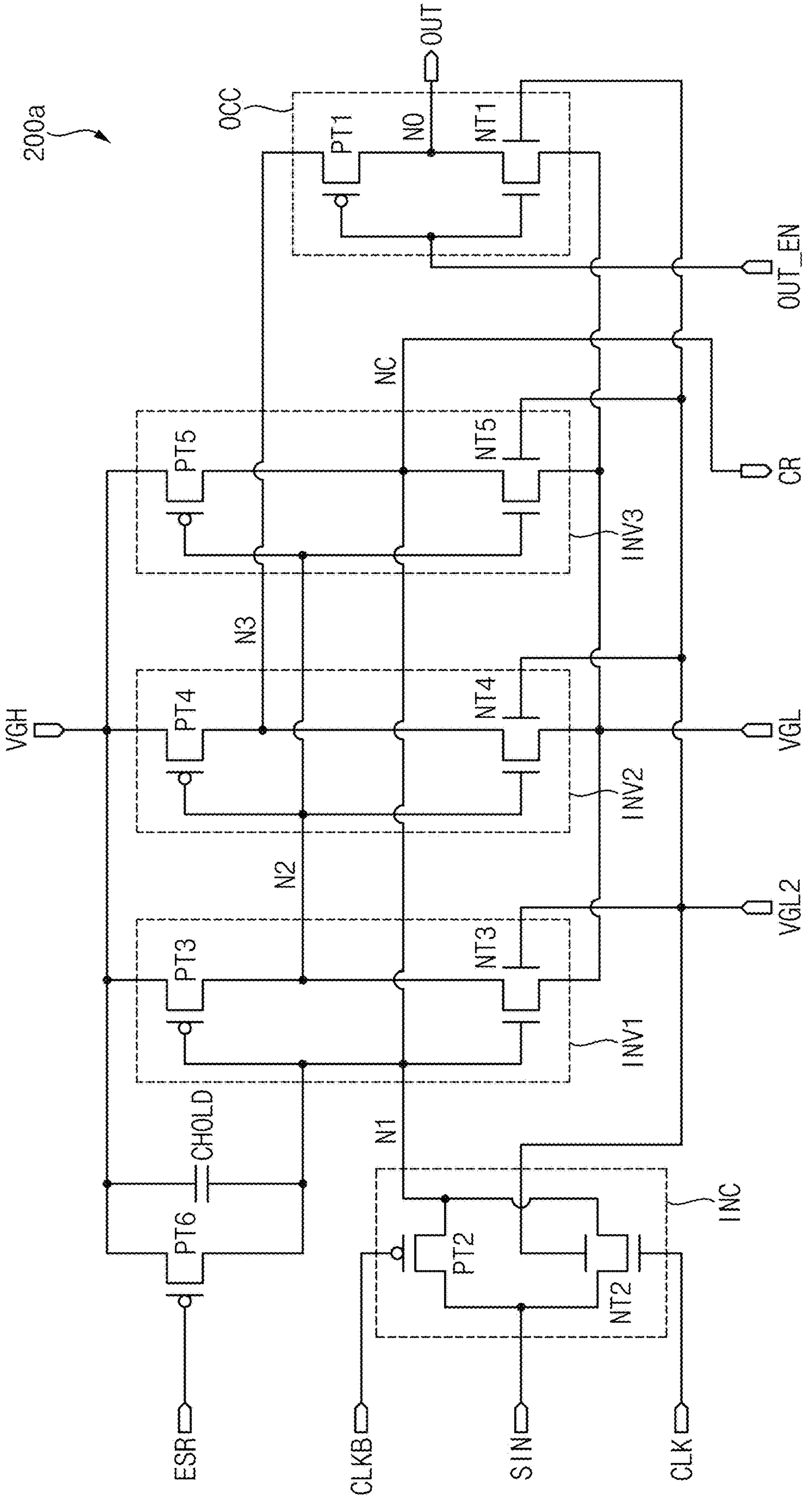
FIG. 4 is a circuit diagram illustrating a stage of a driver according to embodiments.

FIG. 4 is a circuit diagram illustrating a stage 200*a* of a driver according to embodiments.

Referring to FIG. 4, the stage 200*a* of a driver according to embodiments may include an input circuit INC, a holding capacitor CHOLD, a first inverter INV1, a second inverter INV2, a third inverter INV3 and an output control circuit OCC. In some embodiments, the stage 200*a* may further include a sixth PMOS transistor PT6.

The input circuit INC may transfer an input signal SIN to a first node N1 in response to at least one of a clock signal CLK and an inverted clock signal CLKB. In some embodiments, the input circuit INC may include a second PMOS transistor PT2 that transfers the input signal SIN to the first node N1 in response to the inverted clock signal CLKB. In other embodiments, the input circuit INC may include a second NMOS transistor NT2 that transfers the input signal SIN to the first node N1 in response to the clock signal CLK. In still other embodiments, as illustrated in FIG. 4, the input circuit INC may include the second PMOS transistor PT2 and the second NMOS transistor NT2 that are connected in parallel. That is, the input circuit INC may be implemented as a CMOS transmission gate. Further, in some embodiments, the second PMOS transistor PT2 may include a gate which receives the inverted clock signal CLKB, a first terminal which receives the input signal SIN, and a second terminal connected to the first node N1. The second NMOS transistor NT2 may include a gate which receives the clock signal CLK, a first terminal which receives the input signal SIN, and a second terminal connected to the first node N1.

The holding capacitor CHOLD may maintain a voltage of the first node N1 while the second PMOS transistor PT2 and the second NMOS transistor NT2 of the input circuit INC are turned off. In some embodiments, as illustrated in FIG. 4, the holding capacitor CHOLD may be connected between a line which transfers a high gate voltage VGH and the first node N1. That is, the holding capacitor CHOLD may include a first electrode connected to the line which transfers the high gate voltage VGH, and a second electrode connected to the first node N1. In other embodiments, the holding capacitor CHOLD may be connected between a line which transfers a low gate voltage VGL and the first node N1.

The first inverter INV1 may generate a voltage of a second node N2 by inverting the voltage of the first node N1. For example, the first inverter INV1 may provide the low gate voltage VGL to the second node N2 when the first node N1 has the high gate voltage VGH, and may provide the high gate voltage VGH to the second node N2 when the first node N1 has the low gate voltage VGL. In some embodiments, the first inverter INV1 may be implemented as a CMOS inverter including a third PMOS transistor PT3 and a third NMOS transistor NT3 that are connected in series between the line which transfers the high gate voltage VGH and the line which transfers the low gate voltage VGL. Further, in some embodiments, the third PMOS transistor PT3 may include a gate connected to the first node N1, a first terminal connected to the line which transfers the high gate voltage VGH, and a second terminal connected to the second node N2. The third NMOS transistor NT3 may include a gate connected to the first node N1, a first terminal connected to the line which transfers the low gate voltage VGL, and a second terminal connected to the second node N2.

The second inverter INV2 may generate a voltage of a third node N3 by inverting the voltage of the second node N2. For example, the second inverter INV2 may provide the low gate voltage VGL to the third node N3 when the second node N2 has the high gate voltage VGH, and may provide the high gate voltage VGH to the third node N3 when the second node N2 has the low gate voltage VGL. In some embodiments, the second inverter INV2 may be implemented as a CMOS inverter including a fourth PMOS transistor PT4 and a fourth NMOS transistor NT4 that are connected in series between the line which transfers the high gate voltage VGH and the line which transfers the low gate voltage VGL. Further, in some embodiments, the fourth PMOS transistor PT4 may include a gate connected to the second node N2, a first terminal connected to the line which transfers the high gate voltage VGH, and a second terminal connected to the third node N3. The fourth NMOS transistor NT4 may include a gate connected to the second node N2, a first terminal connected to the line which transfers the low gate voltage VGL, and a second terminal connected to the third node N3.

The third inverter INV3 may generate a carry signal CR by inverting the voltage of the second node N2. For example, the third inverter INV3 may generate the carry signal CR having the low gate voltage VGL when the second node N2 has the high gate voltage VGH, and may generate the carry signal CR having the high gate voltage VGH when the second node N2 has the low gate voltage VGL. In some embodiments, the third inverter INV3 may be implemented as a CMOS inverter including a fifth PMOS transistor PT5 and a fifth NMOS transistor NT5 that are connected in series between the line which transfers the high gate voltage VGH and the line which transfers the low gate voltage VGL. Further, in some embodiments, the fifth PMOS transistor PT5 may include a gate connected to the second node N2, a first terminal connected to the line which transfers the high gate voltage VGH, and a second terminal connected to a carry node NC at which the carry signal CR is output. The fifth NMOS transistor NT5 may include a gate connected to the second node N2, a first terminal connected to the line which transfers the low gate voltage VGL, and a second terminal connected to the carry node NC.

The sixth PMOS transistor PT6 may transfer the high gate voltage VGH to the first node N1 in response to a global reset signal ESR. In some embodiments, the global reset signal ESR may have a low level when a power-on sequence of a display device is performed and may be simultaneously provided to a plurality of stages of the driver. Thus, the sixth PMOS transistors PT6 of the plurality of stages may transfer the high gate voltage VGH to the first node N1 during the power-on sequence, thereby stabilizing voltages of nodes N1, N2, N3, NC and NO of the plurality of stages. Further, in some embodiments, the sixth PMOS transistor PT6 may include a gate which receives the global reset signal ESR, a first terminal connected to the line which transfers the high gate voltage VGH, and a first terminal connected to the first node N1. Although FIG. 4 illustrates an example in which the sixth PMOS transistor PT6 is connected to the line which transfers the high gate voltage VGH, in other embodiments, the sixth PMOS transistor PT6 may be connected to the line which transfers the low gate voltage VGL. In this case, the sixth PMOS transistor PT6 may transfer the low gate voltage VGL to the first node N1 during the power-on sequence.

The output control circuit OCC may selectively output the voltage of the third node N3 as an output signal OUT in response to an output enable signal OUT_EN. The output control circuit OCC may output the low gate voltage VGL as the output signal OUT regardless of the voltage of the third node N3 while the output enable signal OUT_EN has a high level, or the high gate voltage VGH. However, while the output enable signal OUT_EN has a low level, or the low gate voltage VGL, the output control circuit OCC may output the voltage of the third node N3 as the output signal OUT. In some embodiments, the output control circuit OCC may include a first PMOS transistor PT1 for outputting the voltage of the third node N3 as the output signal OUT, and a first NMOS transistor NT1 for outputting the low gate voltage VGL as the output signal OUT. Further, in some embodiments, the first PMOS transistor PT1 may include a gate which receives the output enable signal OUT_EN, a first terminal connected to the third node N3, and a second terminal connected to an output node NO at which the output signal OUT is output. The first NMOS transistor NT1 may include a gate which receives the output enable signal OUT_EN, a first terminal connected to the line which transfers the low gate voltage VGL, and a second terminal connected to the output node NO.

In some embodiments, as illustrated in FIG. 4, each of the first through fifth NMOS transistors NT1 through NT5 may include not only a top gate but also a bottom gate, and the bottom gate may receive a second low gate voltage VGL2 that is different from the low gate voltage VGL. The second low gate voltage VGL2 applied to the bottom gate may serve as a body bias voltage for each of the first through fifth NMOS transistors NT1 through NT5, and a threshold voltage of each of the first through fifth NMOS transistors NT1 through NT5 may be adjusted by adjusting the second low gate voltage VGL2. For example, the second low gate voltage VGL2 lower than the low gate voltage VGL may be applied to the bottom gate BML (see FIG. 3 for example), and thus the threshold voltage of each of the first through fifth NMOS transistors NT1 through NT5 may be increased. In this case, a leakage current through the first through fifth NMOS transistors NT1 through NT5 may be reduced.

Hereinafter, an example of an operation of the stage 200*a* will be described with reference to FIGS. 4 through 8.

Figure 5:
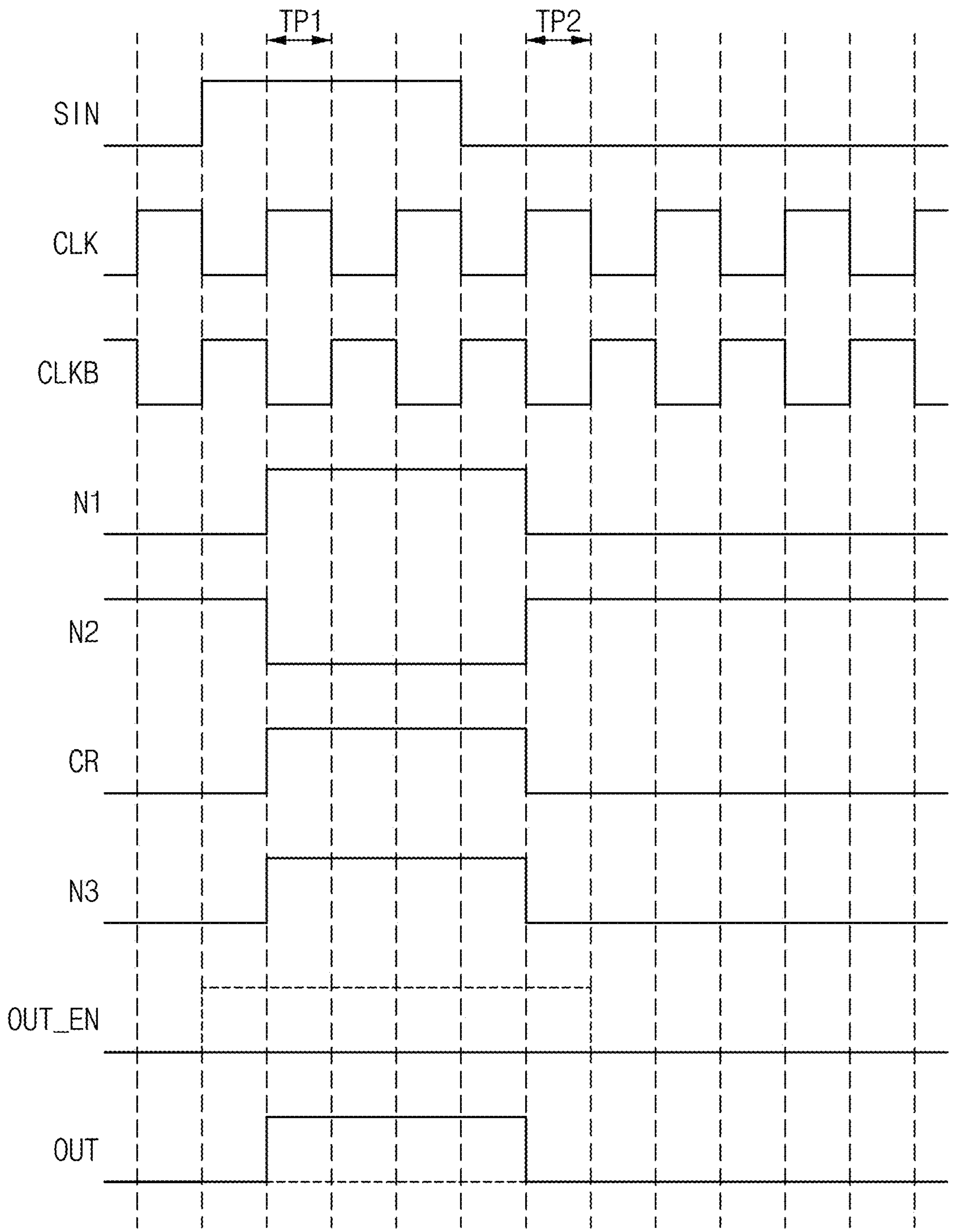
FIG. 5 is a timing diagram for describing an example of an operation of a stage of FIG. 4.
Figure 6:
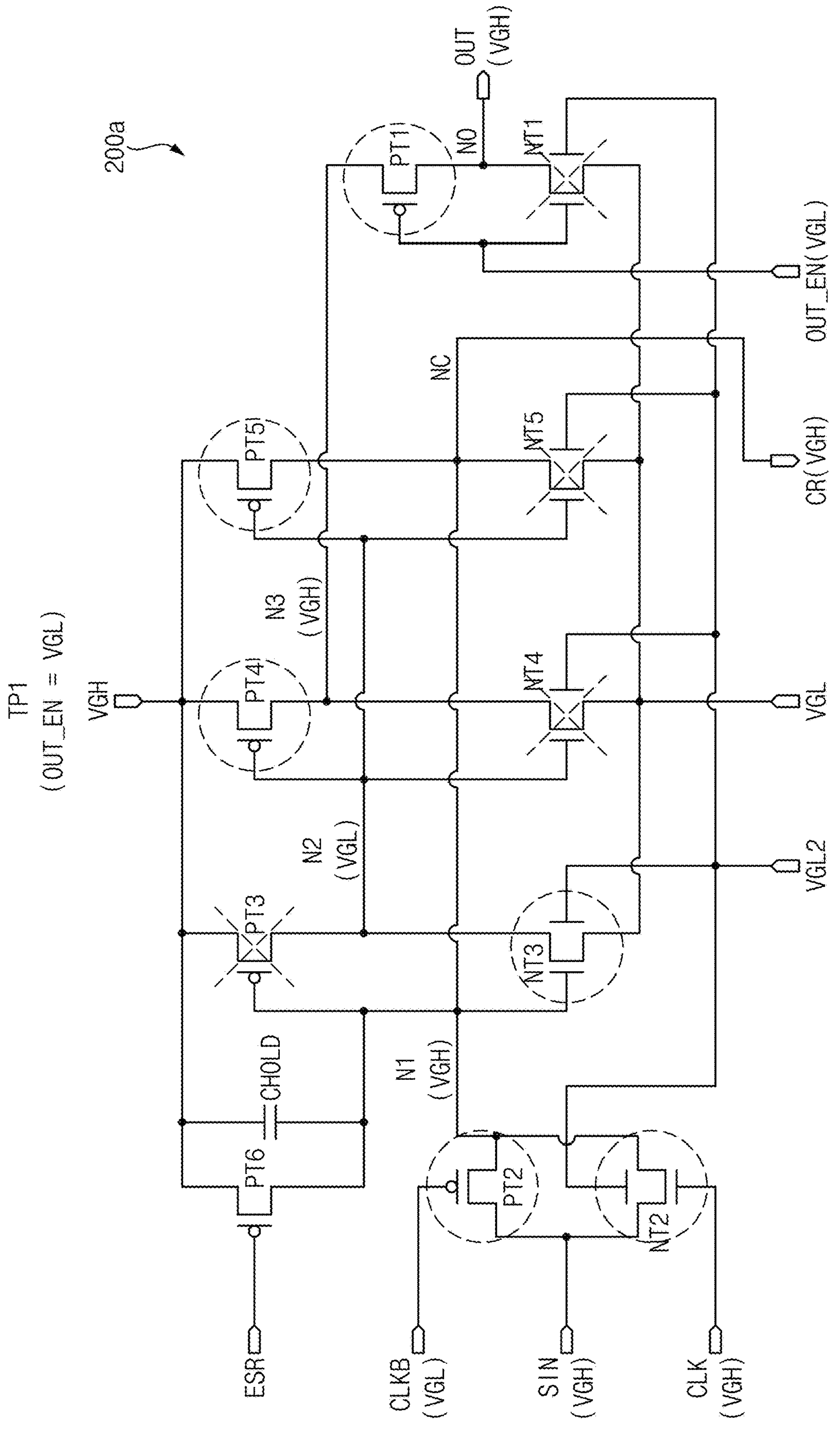
FIG. 6 is a circuit diagram for describing an example of an operation of a stage of FIG. 4 in a first time period when an output enable signal has a low level.
Figure 7:
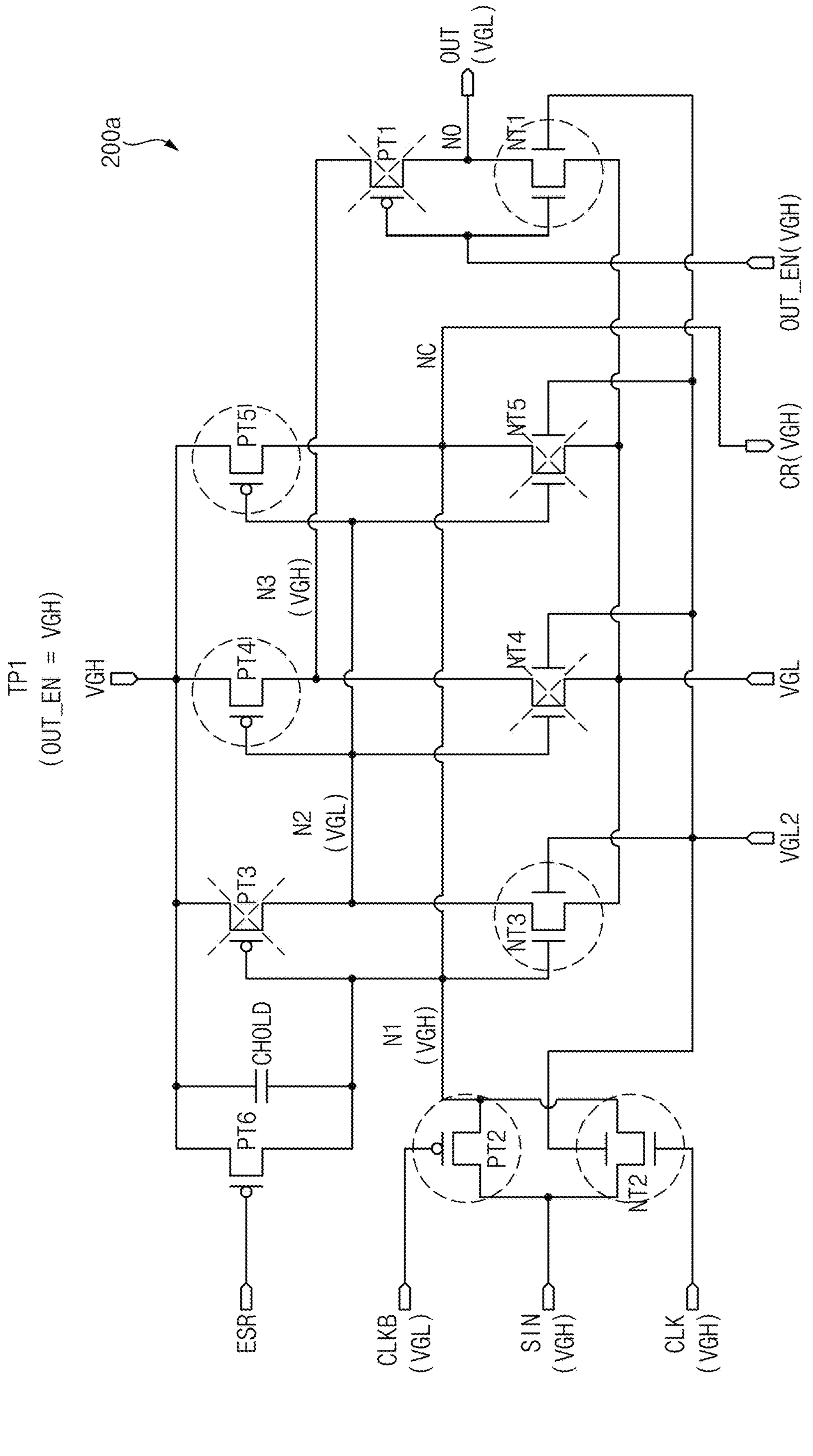
FIG. 7 is a circuit diagram for describing an example of an operation of a stage of FIG. 4 in a first time period when an output enable signal has a high level.
Figure 8:
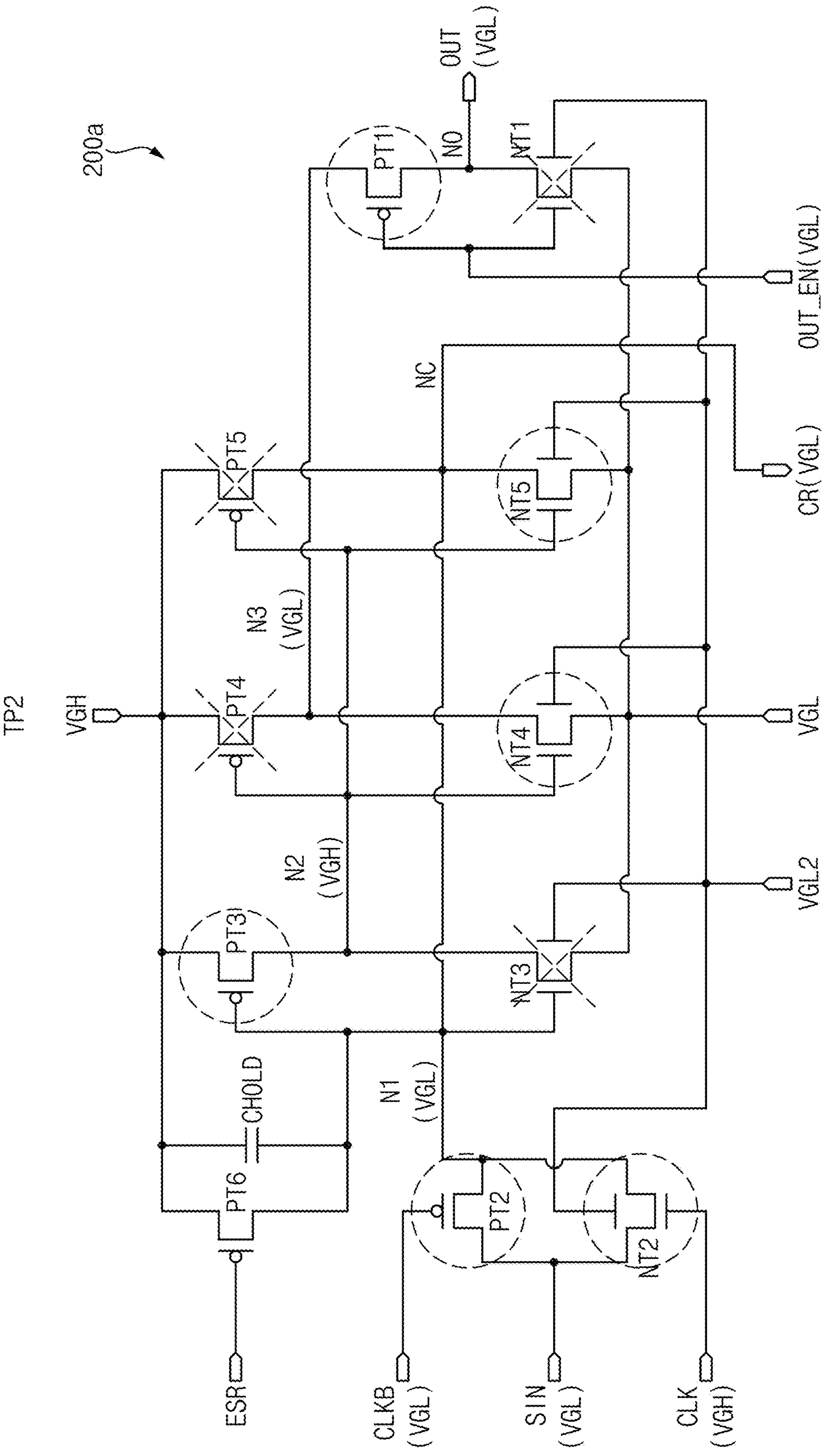
FIG. 8 is a circuit diagram for describing an example of an operation of a stage of FIG. 4 in a second time period.

FIG. 5 is a timing diagram for describing an example of an operation of the stage 200*a* of FIG. 4. FIG. 6 is a circuit diagram for describing an example of an operation of the stage 200*a* of FIG. 4 in a first time period when an output enable signal OUT_EN has a low level. FIG. 7 is a circuit diagram for describing an example of an operation of the stage 200*a* of FIG. 4 in a first time period when an output enable signal OUT_EN has a high level. FIG. 8 is a circuit diagram for describing an example of an operation of the stage 200*a* of FIG. 4 in a second time period.

Referring to FIGS. 4 and 5, the stage 200*a* may start outputting the carry signal CR having the high gate voltage VGH when the clock signal CLK becomes the high gate voltage VGH after the input signal SIN has the high gate voltage VGH. Further, while the carry signal CR having the high gate voltage VGH is output, or while the third node N3 has the high gate voltage VGH, the stage 200*a* may selectively output the output signal OUT having the high gate voltage VGH according to a level of the output enable signal OUT_EN.

In a case where the output enable signal OUT_EN has the low gate voltage VGL, in a first time period TP1 in which the input signal SIN has the high gate voltage VGH and the clock signal CLK has the high gate voltage VGH, the stage 200*a* may output the carry signal CR having the high gate voltage VGH and the output signal OUT having the high gate voltage VGH.

For example, in the first time period TP1, as illustrated in FIG. 6, the second NMOS transistor NT2 may be turned on in response to the clock signal CLK having the high gate voltage VGH, the second PMOS transistor PT2 may be turned on in response to the inverted clock signal CLKB having the low gate voltage VGL, and the second NMOS transistor NT2 and the second PMOS transistor PT2 may transfer the input signal SIN having the high gate voltage VGH to the first node N1. Thus, the first node N1 may have the high gate voltage VGH. Further, the holding capacitor CHOLD may maintain the high gate voltage VGH at the first node N1.

The third PMOS transistor PT3 may be turned off in response to the high gate voltage VGH of the first node N1, the third NMOS transistor NT3 may be turned on in response to the high gate voltage VGH of the first node N1, and the third NMOS transistor NT3 may transfer the low gate voltage VGL to the second node N2. Thus, the second node N2 may have the low gate voltage VGL.

The fourth NMOS transistor NT4 may be turned off in response to the low gate voltage VGL of the second node N2, the fourth PMOS transistor PT4 may be turned on in response to the low gate voltage VGL of the second node N2, and the fourth PMOS transistor PT4 may transfer the high gate voltage VGH to the third node N3. Thus, the third node N3 may have the high gate voltage VGH.

Further, the fifth NMOS transistor NT5 may be turned off in response to the low gate voltage VGL of the second node N2, the fifth PMOS transistor PT5 may be turned on in response to the low gate voltage VGL of the second node N2, and the fifth PMOS transistor PT5 may transfer the high gate voltage VGH to the carry node NC. Thus, the carry signal CR having the high gate voltage VGH may be output at the carry node NC.

In the case where the output enable signal OUT_EN has the low gate voltage VGL, as illustrated in FIG. 6, the first NMOS transistor NT1 may be turned off in response to the output enable signal OUT_EN having the low gate voltage VGL, the first PMOS transistor PT1 may be turned on in response to the output enable signal OUT_EN having the low gate voltage VGL, and the first PMOS transistor PT1 may transfer the high gate voltage VGH of the third node N3 to the output node NO. Thus, the output signal OUT having the high gate voltage VGH may be output at the output node NO.

In other embodiments, in a case where the output enable signal OUT_EN has the high gate voltage VGH as indicated by the dashed line in FIG. 5, in the first time period TP1 in which the input signal SIN has the high gate voltage VGH and the clock signal CLK has the high gate voltage VGH, the stage 200*a* may output the carry signal CR having the high gate voltage VGH, but may not output the output signal OUT having the high gate voltage VGH. That is, the stage 200*a* may output the low gate voltage VGL as the output signal OUT as indicated by the dashed line in FIG. 5.

For example, in the first time period TP1, as illustrated in FIG. 7, in the case where the output enable signal OUT_EN has the high gate voltage VGH, the first PMOS transistor PT1 may be turned off in response to the output enable signal OUT_EN having the high gate voltage VGH, the first NMOS transistor NT1 may be turned on in response to the output enable signal OUT_EN having the high gate voltage VGH, and the first NMOS transistor NT1 may transfer the low gate voltage VGL to the output node NO. Thus, although the third node N3 has the high gate voltage VGH, the output signal OUT having the high gate voltage VGH may not be output, and the output signal OUT having the low gate voltage VGL may be output at the output node NO.

As described above, the stage 200*a* may output the output signal OUT having the high gate voltage VGH in response to the output enable signal OUT_EN having the low level (or the low gate voltage VGL), and may not output the output signal OUT having the high gate voltage VGH in response to the output enable signal OUT_EN having the high level (or the high gate voltage VGH). Accordingly, the driver including the stage 200*a* may selectively output the output signals OUT in a period in which the output enable signal OUT_EN has the low level, but may not output the output signals OUT in a period in which the output enable signal OUT_EN has the high level. Thus, the driver including the stage 200*a* may selectively output the output signals OUT to respective panel regions of a display panel. Therefore, the driver including the stage 200*a* may be suitable for a display device that performs a multi-frequency driving (MFD) operation that drives the respective panel regions at different driving frequencies.

In a second time period TP2 in which the input signal SIN has the low gate voltage VGL and the clock signal CLK has the high gate voltage VGH, the stage 200*a* may output the carry signal CR having the low gate voltage VGL and the output signal OUT having the low gate voltage VGL.

For example, in the second time period TP2, as illustrated in FIG. 8, the second NMOS transistor NT2 may be turned on in response to the clock signal CLK having the high gate voltage VGH, the second PMOS transistor PT2 may be turned on in response to the inverted clock signal CLKB having the low gate voltage VGL, and the second NMOS transistor NT2 and the second PMOS transistor PT2 may transfer the input signal SIN having the low gate voltage VGL to the first node N1. Thus, the first node N1 may have the low gate voltage VGL. Further, the holding capacitor CHOLD may maintain the low gate voltage VGL at the first node N1.

The third NMOS transistor NT3 may be turned off in response to the low gate voltage VGL of the first node N1, the third PMOS transistor PT3 may be turned on in response to the low gate voltage VGL of the first node N1, and the third PMOS transistor PT3 may transfer the high gate voltage VGH to the second node N2. Thus, the second node N2 may have the high gate voltage VGH.

The fourth PMOS transistor PT4 may be turned off in response to the high gate voltage VGH of the second node N2, the fourth NMOS transistor NT4 may be turned on in response to the high gate voltage VGH of the second node N2, and the fourth NMOS transistor NT4 may transfer the low gate voltage VGL to the third node N3. Thus, the third node N3 may have the low gate voltage VGL.

Further, the fifth PMOS transistor PT5 may be turned off in response to the high gate voltage VGH of the second node N2, the fifth NMOS transistor NT5 may be turned on in response to the high gate voltage VGH of the second node N2, and the fifth NMOS transistor NT5 may transfer the low gate voltage VGL to the carry node NC. Thus, the carry signal CR having the low gate voltage VGL may be output at the carry node NC.

As illustrated in FIG. 8, in the case where the output enable signal OUT_EN has the low gate voltage VGL, the first NMOS transistor NT1 may be turned off in response to the output enable signal OUT_EN having the low gate voltage VGL, the first PMOS transistor PT1 may be turned on in response to the output enable signal OUT_EN having the low gate voltage VGL, and the first PMOS transistor PT1 may transfer the low gate voltage VGL of the third node N3 to the output node NO. Thus, the output signal OUT having the low gate voltage VGL may be output at the output node NO. In other embodiments, even in the case where the output enable signal OUT_EN has the high gate voltage VGH, the first NMOS transistor NT1 may be turned on in response to the output enable signal OUT_EN having the high gate voltage VGH, the first NMOS transistor NT1 may transfer the low gate voltage VGL to the output node NO, and thus the output signal OUT having the low gate voltage VGL may be output at the output node NO.

Figure 9:
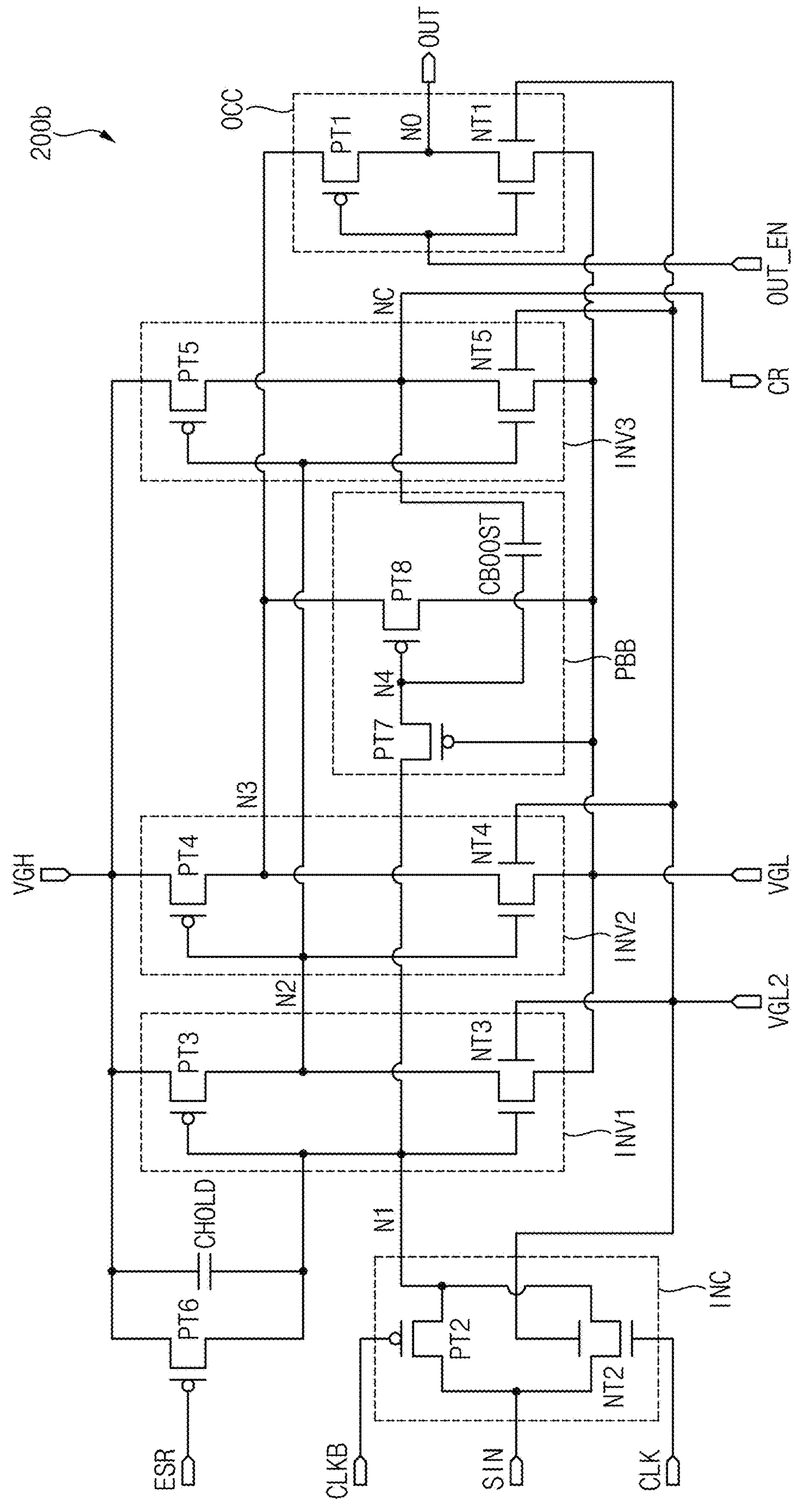
FIG. 9 is a circuit diagram illustrating a stage of a driver according to embodiments.

FIG. 9 is a circuit diagram illustrating a stage 200*b* of a driver according to embodiments.

Referring to FIG. 9, the stage 200*b* of a driver according to embodiments may include an input circuit INC, a holding capacitor CHOLD, a first inverter INV1, a second inverter INV2, a third inverter INV3, an output control circuit OCC, a sixth PMOS transistor PT6 and a PMOS boosting buffer PBB. The stage 200*b* of FIG. 9 may have substantially the same configuration and substantially the same operation as the stage 200*a* of FIG. 4, except that the stage 200*b* may further include the PMOS boosting buffer PBB.

When a voltage of a first node N1 has a low level, the PMOS boosting buffer PBB may output a low gate voltage VGL to a third node N3. In some embodiments, the PMOS boosting buffer PBB may include a boosting capacitor CBOOST including a first electrode connected to a carry node NC at which a carry signal CR is output, and a second electrode connected to a fourth node N4, a seventh PMOS transistor PT7 including a gate connected to a line which transfers the low gate voltage VGL, a first terminal connected to the first node N1, and a second terminal connected to the fourth node N4, and an eighth PMOS transistor PT8 including a gate connected to the fourth node N4, a first terminal connected to the third node N3, and a second terminal connected to the line which transfers the low gate voltage VGL.

When the voltage of the first node N1 changes from a high gate voltage VGH to the low gate voltage VGL, the seventh PMOS transistor PT7 may transfer the low gate voltage VGL of the first node N1 to the fourth node N4, and the voltage of the fourth node N4 also may change from the high gate voltage VGH to the low gate voltage VGL. When the voltage of the fourth node N4 changes from the high gate voltage VGH to the low gate voltage VGL, the eighth PMOS transistor PT8 may transfer the low gate voltage VGL to the third node N3, the voltage of the third node N3 also may decrease from the high gate voltage VGH to the low gate voltage VGL. Further, when the voltage of the first node N1 changes from the high gate voltage VGH to the low gate voltage VGL while the carry node NC has the high gate voltage VGH, the first inverter INV1 may provide the high gate voltage VGH to a second node N2, the third inverter INV3 may provide the low gate voltage VGL to the carry node NC, and thus the voltage of the carry node NC may decrease from the high gate voltage VGH to the low gate voltage VGL. When the voltage of the carry node NC connected to the first electrode of the boosting capacitor CBOOST decreases, the voltage of the fourth node N4 connected to the second electrode of the boosting capacitor CBOOST also may decreases from the low gate voltage VGL to a boosted low gate voltage lower than the low gate voltage VGL. This operation that decreases the voltage of the fourth node N4 to the boosted low gate voltage lower than the low gate voltage VGL may be referred to as a boosting operation. In other words, while the first node N1 and the third node N3 have the low gate voltage VGL, the voltage of the fourth node N4 may have the boosted low gate voltage lower than the low gate voltage VGL. Since the fourth node N4 has the boosted low gate voltage, the eighth PMOS transistor PT8 may be fully turned on, and the voltage of the third node N3 may rapidly decrease from the high gate voltage VGH to the low gate voltage VGL. Further, in a case where the output enable signal OUT_EN has the low gate voltage VGL, the output signal OUT at the output node NO also may rapidly decrease from the high gate voltage VGH to the low gate voltage VGL.

Figure 10:
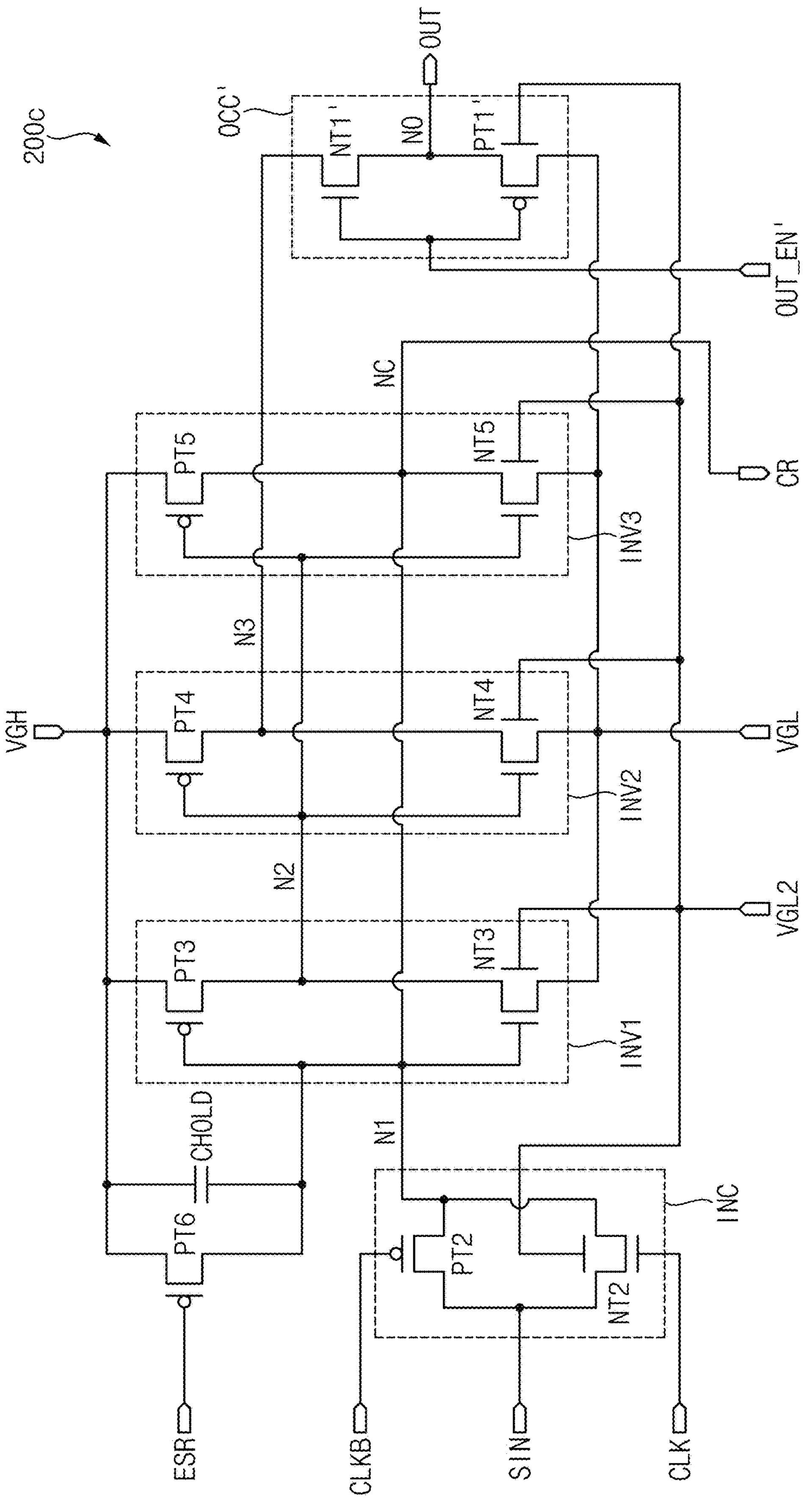
FIG. 10 is a circuit diagram illustrating a stage of a driver according to embodiments.
Figure 11:
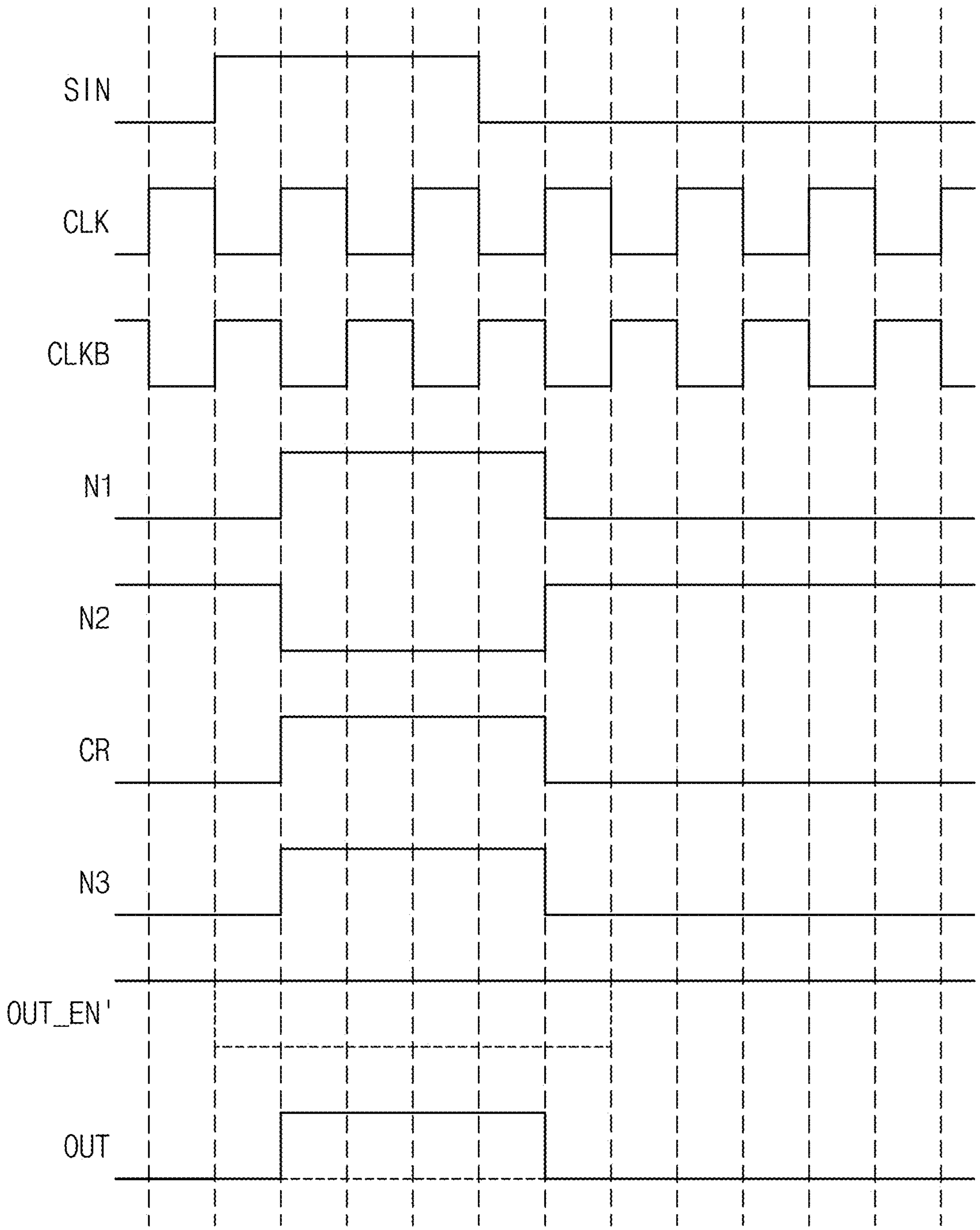
FIG. 11 is a timing diagram for describing an example of an operation of a stage of FIG. 10.

FIG. 10 is a circuit diagram illustrating a stage 200*c* of a driver according to embodiments. FIG. 11 is a timing diagram for describing an example of an operation of the stage 200*c* of FIG. 10.

Referring to FIG. 10, the stage 200*c* of a driver according to embodiments may include an input circuit INC, a holding capacitor CHOLD, a first inverter INV1, a second inverter INV2, a third inverter INV3, an output control circuit OCC' and a sixth PMOS transistor PT6. The stage 200*c* of FIG. 10 may have substantially the same configuration and substantially the same operation as a stage 200*a* of FIG. 4, except that the output control circuit OCC' may output a voltage of a third node N3 as an output signal OUT in response to an output enable signal OUT_EN' having a high level, and may output a low gate voltage VGL as the output signal OUT in response to the output enable signal OUT_EN' having a low level.

The output control circuit OCC' may include a first NMOS transistor NT1' that outputs the voltage of the third node N3 as the output signal OUT when the output enable signal OUT_EN' has the high level, and a first PMOS transistor PT1' that outputs the low gate voltage VGL as the output signal OUT when the output enable signal OUT_EN' has the low level. In some embodiments, the first NMOS transistor NT1' may include a gate which receives the output enable signal OUT_EN', a first terminal connected to the third node N3, and a second terminal connected to an output node NO at which the output signal OUT is output. The first PMOS transistor PT1' may include a gate which receives the output enable signal OUT_EN', a first terminal connected to a line which transfers the low gate voltage VGL, and a second terminal connected to the output node NO.

As illustrated in FIG. 11, while a carry signal CR having a high gate voltage VGH is output, or while the third node N3 has the high gate voltage VGH, the stage 200*c* including the output control circuit OCC' may output the output signal OUT having the high gate voltage VGH in response to the output enable signal OUT_EN' having the high level, and may not output the output signal OUT having the high gate voltage VGH in response to the output enable signal OUT_EN' having the low level. Thus, even if the third node N3 has the high gate voltage VGH, the stage 200*c* including the output control circuit OCC' may output the low gate voltage VGL as the output signal OUT as indicated in the dashed line in FIG. 11 in response to the output enable signal OUT_EN' having the low level as indicated in the dashed line in FIG. 11. Accordingly, the driver including the stage 200*c* may output the output signals OUT in a period in which the output enable signal OUT_EN' has the high level, but may not output the output signals OUT in a period in which the output enable signal OUT_EN' has the low level. Thus, the driver including the stage 200*c* may selectively output the output signals OUT to respective panel regions of a display panel. Therefore, the driver including the stage 200*c* may be suitable for a display device that performs a multi-frequency driving (MFD) operation that drives the respective panel regions at different driving frequencies.

Figure 12:
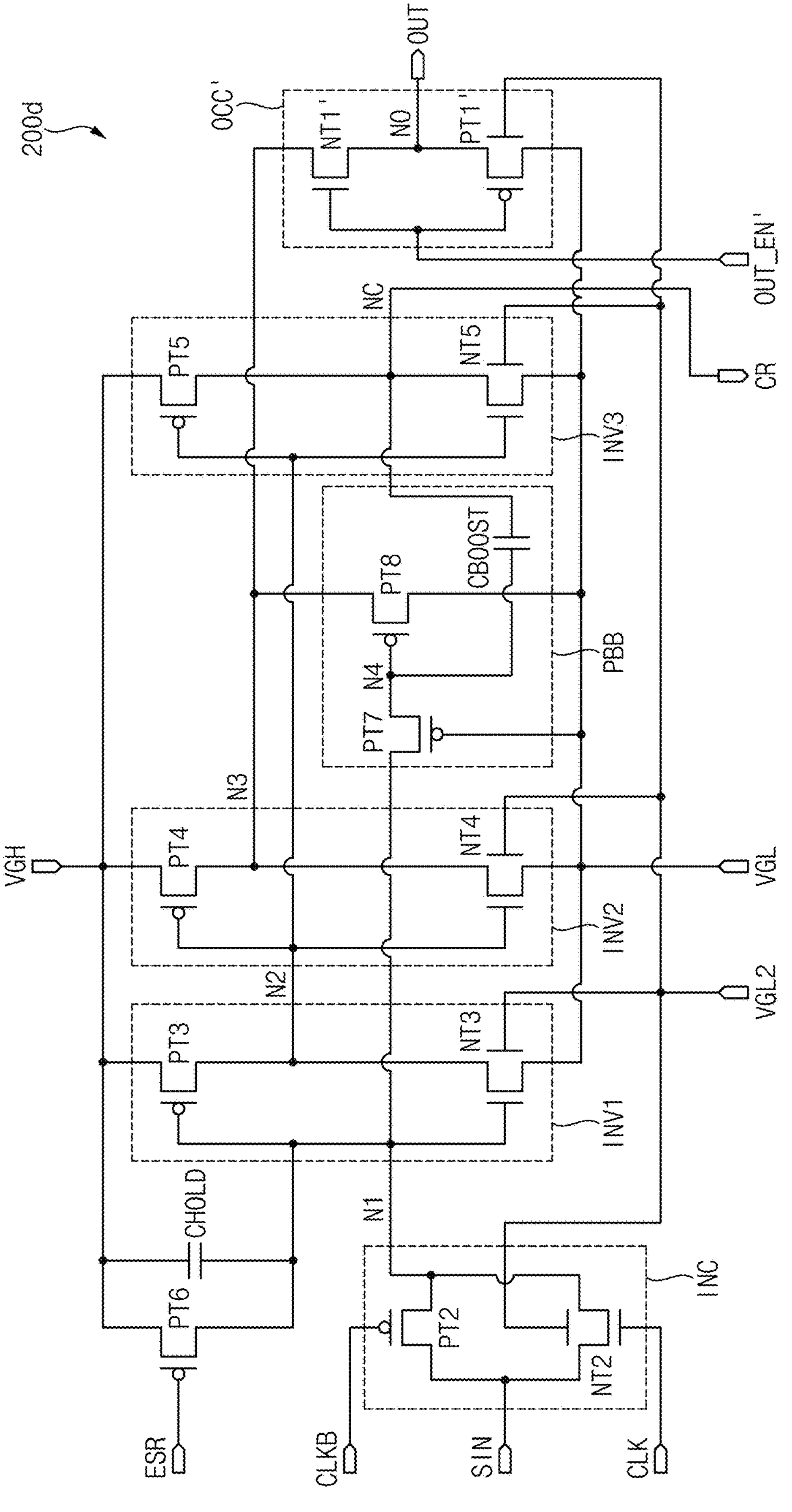
FIG. 12 is a circuit diagram illustrating a stage of a driver according to embodiments.

FIG. 12 is a circuit diagram illustrating a stage 200*d* of a driver according to embodiments.

Referring to FIG. 12, the stage 200*d* of a driver according to embodiments may include an input circuit INC, a holding capacitor CHOLD, a first inverter INV1, a second inverter INV2, a third inverter INV3, an output control circuit OCC', a sixth PMOS transistor PT6 and a PMOS boosting buffer PBB. The stage 200*d* of FIG. 12 may have substantially the same configuration and substantially the same operation as a stage 200*c* of FIG. 10, except that the stage 200*d* may further include the PMOS boosting buffer PBB. The PMOS boosting buffer PBB may perform a boosting operation to decrease a voltage of a fourth node N4 to a boosted low gate voltage lower than a low gate voltage VGL, thereby rapidly decrease a voltage of a third node and/or an output signal OUT.

Figure 13:
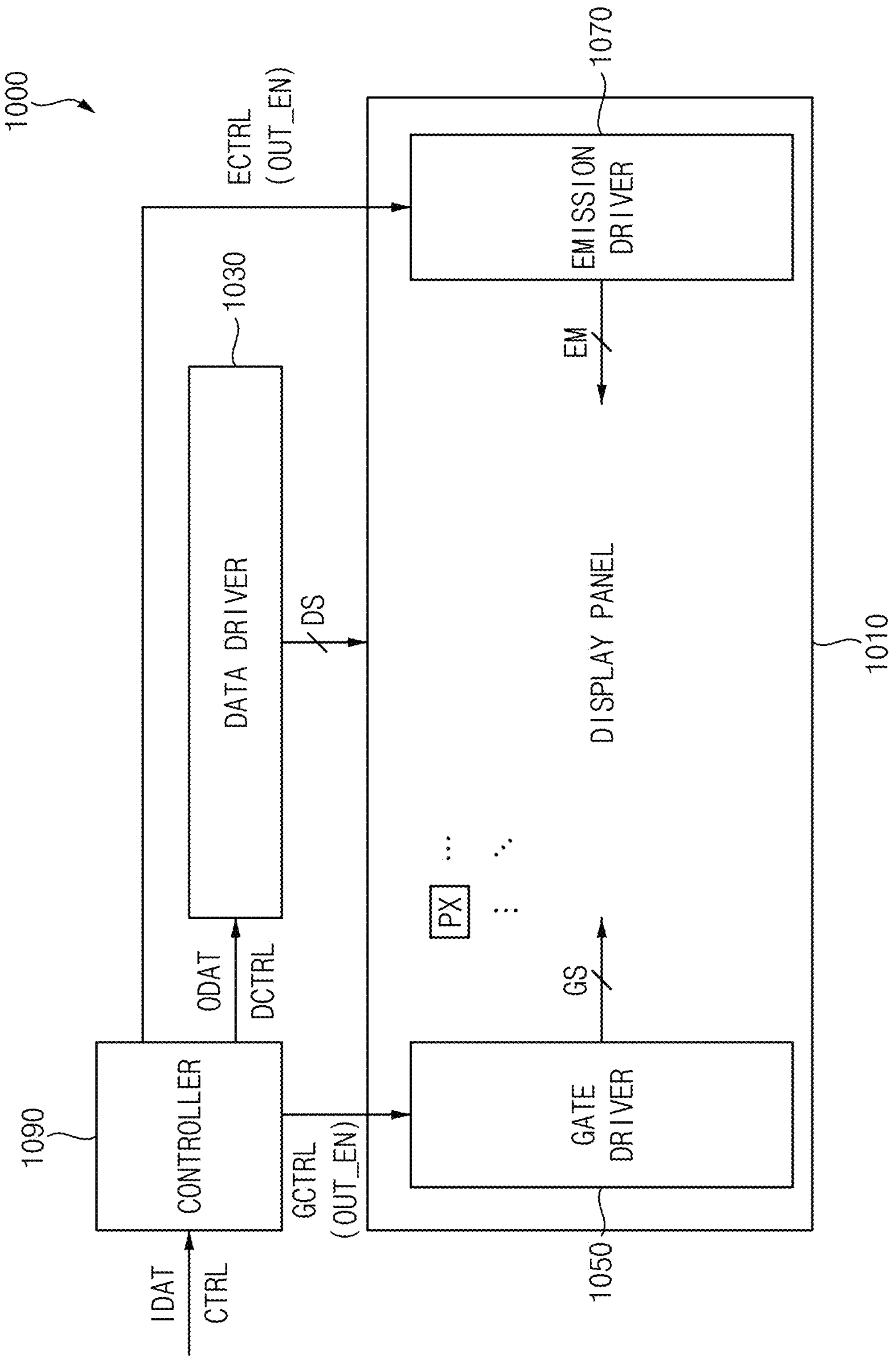
FIG. 13 is a block diagram illustrating a display device according to embodiments.
Figure 14A:
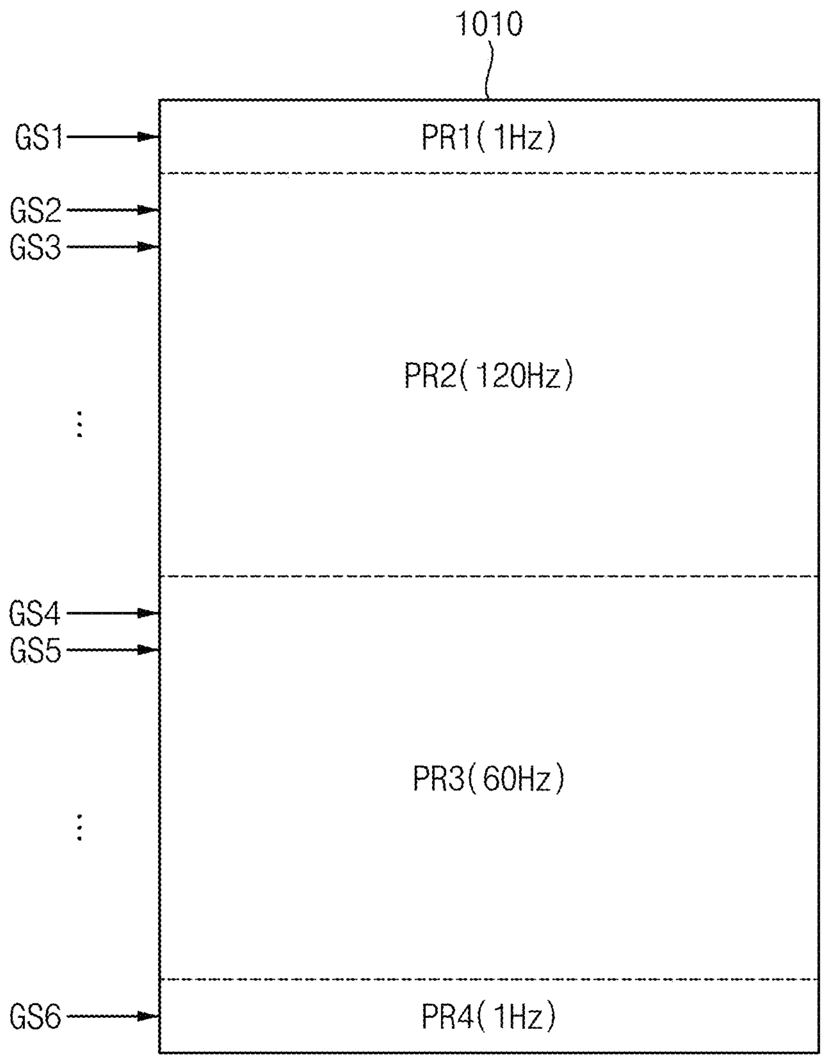
FIG. 14A is a diagram illustrating an example of a display panel in which a plurality of panel regions are driven at different driving frequencies.
Figure 14B:
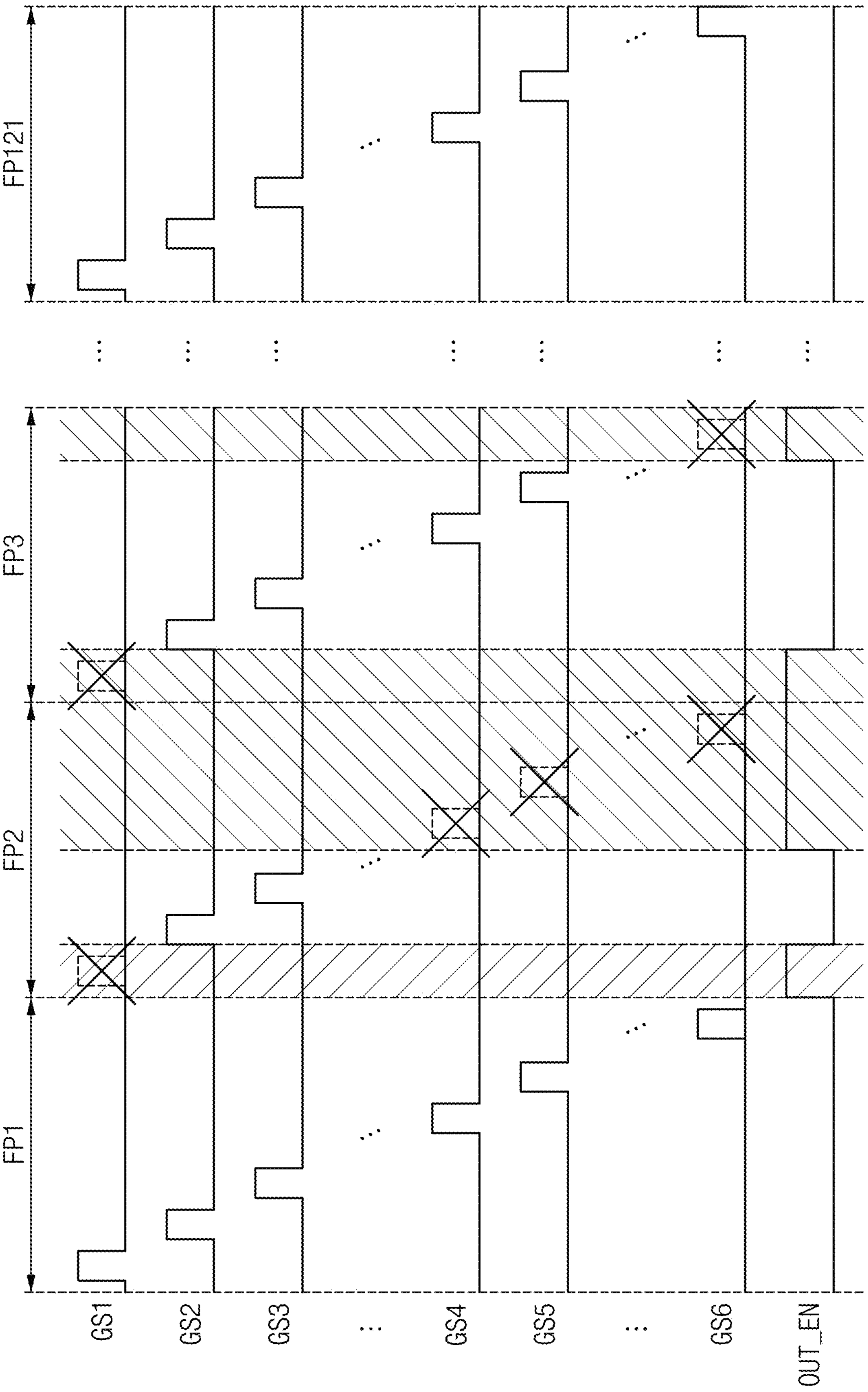
FIGS. 14B and 14C are diagrams illustrating examples of gate signals applied to the display panel of FIG. 14A.
Figure 14C:
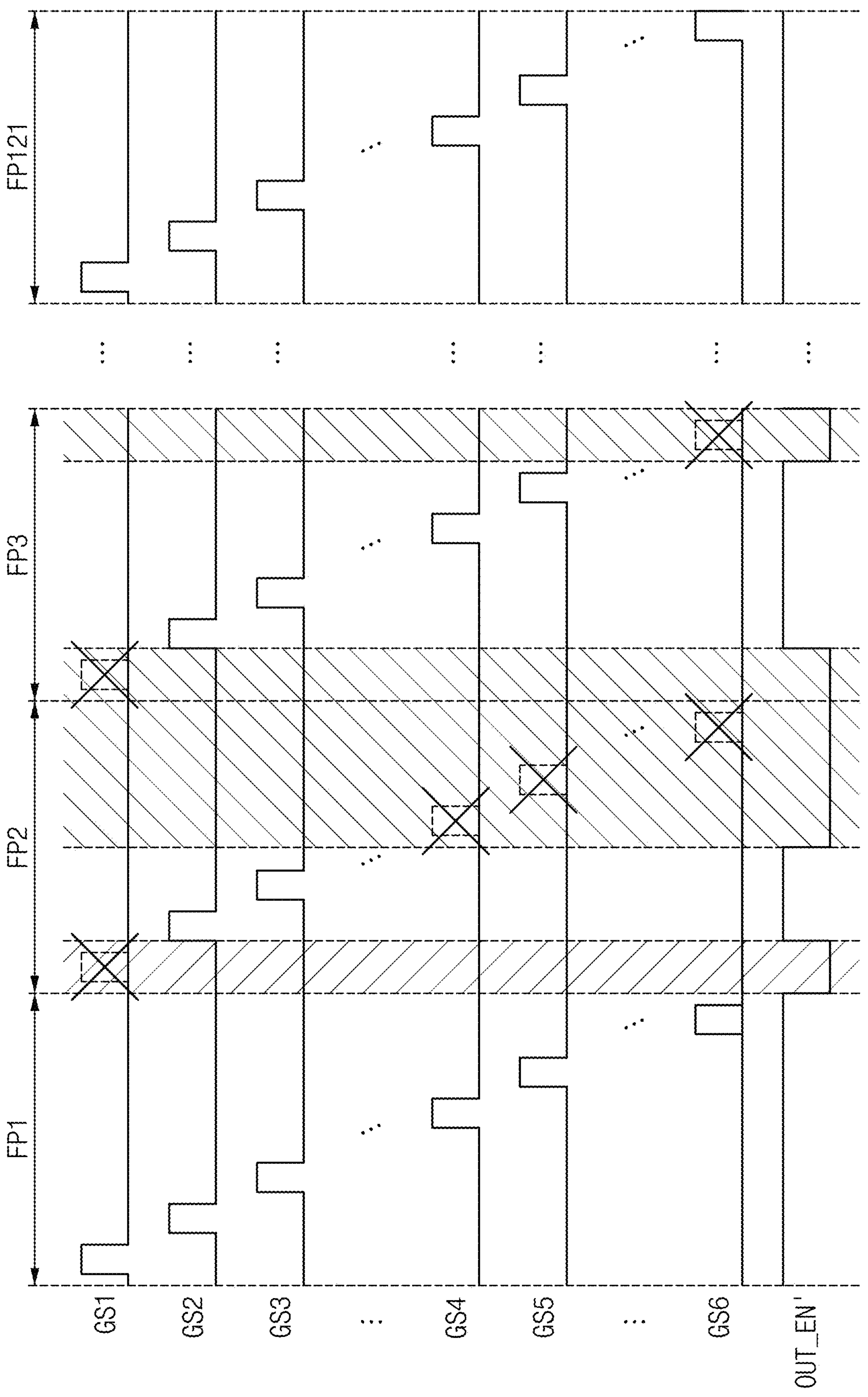

FIG. 13 is a block diagram illustrating a display device 1000 according to embodiments. FIG. 14A is a diagram illustrating an example of a display panel 1010 in which a plurality of panel regions PR1, PR2, PR3, PR4 are driven at different driving frequencies. FIGS. 14B and 14C are diagrams illustrating examples of gate signals applied to the display panel 1010 of FIG. 14A.

Referring to FIG. 13, the display device 1000 according to embodiments may include the display panel 1010 that includes a plurality of pixels PX, a data driver 1030 that provides data signals DS to the plurality of pixels PX, a gate driver 1050 that provides gate signals GS to the plurality of pixels PX, an emission driver 1070 that provides emission signals EM to the plurality of pixels PX, and a controller 1090 that controls the data driver 1030, the gate driver 1050 and the emission driver 1070.

The display panel 1010 may include data lines, gate lines, emission lines, and the plurality of pixels PX connected thereto. In some embodiments, each pixel PX may include a light emitting element, and the display panel 1010 may be a light emitting display panel. In some embodiments, the light emitting element may be an organic light emitting diode (OLED). In other embodiments, the light emitting element may be a nano light emitting diode (NED), a quantum dot (QD) light emitting diode, a micro light emitting diode, an inorganic light emitting diode, or any other suitable light emitting element. In other embodiments, the display panel 1010 may be a liquid crystal display (LCD) panel, or any other suitable display panel.

The data driver 1030 may generate the data signals DS based on a data control signal DCTRL and output image data ODAT received from the controller 1090, and may provide the data signals DS to the plurality of pixels PX through the data lines. In some embodiments, the data control signal DCTRL may include, but is not limited to, an output data enable signal, a horizontal start signal, and a load signal. In some embodiments, the data driver 1030 and the controller 1090 may be implemented as a single integrated circuit, and the single integrated circuit may be referred to as a timing controller embedded data driver (TED) integrated circuit. In other embodiments, the data driver 1030 and the controller 1090 may be implemented as separate integrated circuits.

The gate driver 1050 may generate the gate signals GS based on a gate control signals GCTRL received from the controller 1090, and may sequentially provide the gate signals GS to the plurality of pixels PX through the gate lines on a row-by-row basis. The gate control signal GCTRL may include, but is not limited to, a gate start signal and a gate clock signal. In some embodiments, the gate control signal GCTRL may further include an output enable signal OUT_EN for selectively outputting the gate signals GS. Further, in some embodiments, the gate driver 1050 may be a driver 100 of FIG. 1 including a stage 200 of FIG. 2, a stage 200*a* of FIG. 4, a stage 200*b* of FIG. 9, a stage 200*c* of FIG. 10 or a stage 200*d* of FIG. 12. Further, in some embodiments, as illustrated in FIG. 13, the gate driver 1050 may be integrated or formed in the display panel 1010. In other embodiments, the gate driver 1050 may be implemented as one or more integrated circuits.

The emission driver 1070 may generate the emission signals EM based on an emission control signal ECTRL received from the controller 1090, and may sequentially provide the emission signals EM to the plurality of pixels PX through the emission lines on a row-by-row basis. The emission control signal ECTRL may include, but is not limited to, an emission start signal and an emission clock signal. In some embodiments, the emission control signal ECTRL may further include an output enable signal OUT_EN for selectively outputting the emission signals EM. Further, in some embodiments, the emission driver 1070 may be a driver 100 of FIG. 1 including a stage 200 of FIG. 2, a stage 200*a* of FIG. 4, a stage 200*b* of FIG. 9, a stage 200*c* of FIG. 10 or a stage 200*d* of FIG. 12. Further, in some embodiments, as illustrated in FIG. 13, the emission driver 1070 may be integrated or formed in the display panel 1010. In other embodiments, the emission driver 1070 may be implemented as one or more integrated circuits.

The controller 1090 (e.g., a timing controller (TCON)) may receive input image data IDAT and a control signal CTRL from an external host processor (e.g., a graphics processing unit (GPU), an application processor (AP), or a graphics card). In some embodiments, the input image data IDAT may be RGB image data including red image data, green image data and blue image data. In some embodiments, the control signal CTRL may include, but is not limited to, a vertical synchronization signal, a horizontal synchronization signal, an input data enable signal, a master clock signal, etc. The controller 1090 may generate the output image data ODAT, the data control signal DCTRL, the gate control signal GCTRL and the emission control signal ECTRL based on the input image data IDAT and the control signal CTRL. The controller 1090 may control an operation of the data driver 1030 by providing the output image data ODAT and the data control signal DCTRL to the data driver 1030, may control an operation of the gate driver 1050 by providing the gate control signal GCTRL to the gate driver 1050, and may control and operation of the emission driver 1070 by providing the emission control signal ECTRL to the emission driver 1070.

The display device 1000 according to embodiments may perform a multi-frequency driving (MFD) operation that drives a plurality of panel regions of the display panel 1010 at different driving frequencies. Further, in the display device 1000 according to embodiments, to perform the MFD operation, at least one of the gate driver 1050 and the emission driver 1070 may be implemented as the driver 100 of FIG. 1, and may selectively provide output signal (e.g., the gate signals GS and/or the emission signals EM) to the plurality of panel regions in response to the output enable signal OUT_EN.

For example, as illustrated in FIG. 14A, in a case where the gate driver 1050 is implemented as the driver 100 of FIG. 1, the first panel region PR1 receiving a first gate signal GS1 id driven at a driving frequency of about 1 Hz, the second panel region PR2 receiving second and third gate signals GS2 and GS3 is driven at a driving frequency about 120 Hz, the third panel region PR3 receiving fourth and fifth gate signals GS4 and GS3 is driven at a driving frequency of about 60 Hz, and the fourth panel region PR4 receiving a sixth gate signal GS6 is driven at a driving frequency of about 1 Hz. As illustrated in FIGS. 14B and 14C, the controller 1090 may generate the output enable signal OUT_EN such that the first gate signal GS1 is output in one frame period FP1 among one hundred and twenty frame periods FP1, FP2, FP3, . . . , FP121, the second and third gate signals GS2 and GS3 are output in all one hundred and twenty frame periods FP1, FP2, FP3, . . . , FP121, the fourth and fifth gate signals GS4 and GS5 are output in sixty frame periods FP1, FP3, etc. among one hundred and twenty frame periods FP1, FP2, FP3, . . . , FP121, and the sixth gate signal GS6 is output in one frame period FP1 among one hundred and twenty frame periods FP1, FP2, FP3, . . . , FP121.

For example, in a case where the gate driver 1050 includes the stage 200*a* of FIG. 4 or the stage 200*b* of FIG. 9, as illustrated in FIG. 14B, the controller 1090 may generate the output enable signal OUT_EN that has a low level for the entire time of a first frame period FP1, and the gate driver 1050 may output all gate signals GS1, GS2, GS3, etc., GS4, GS5, etc. and GS6 to the first through fourth panel regions PR1 through PR4 in response to the output enable signal OUT_EN. In a second frame period FP2, the controller 1090 may generate the output enable signal OUT_EN that has the low level during a time within the second frame period FP2 allocated to the second panel region PR2, and has a high level during a time within the second frame period FP2 allocated to the first, third and fourth panel regions PR1, PR3 and PR4. In the second frame period FP2, in response to the output enable signal OUT_EN, the gate driver 1050 may output the gate signals GS2, GS3, etc. to the second panel region PR2, but may not output the gate signals GS1, GS4, GS5, etc. and GS6 to the first, third and fourth panel regions PR1, PR3 and PR4. Further, in a third frame period FP3, the controller 1090 may generate the output enable signal OUT_EN that has the low level during a time within the third frame period FP3 allocated to the second and third panel regions PR2 and PR3, and has the high level during a time within the third frame period FP3 allocated to the first and fourth panel regions PR1 and PR4. In the third frame period FP3, in response to the output enable signal OUT_EN, the gate driver 1050 may output the gate signals GS2, GS3, etc., GS4, GS5, etc. to the second and third panel regions PR2 and PR3, but may not output the gate signals GS1 and GS6 to the first and fourth panel regions PR1 and PR4. Further, in one hundred twenty-first frame period FP121, the controller 1090 may again generate the output enable signal OUT_EN that has the low level for the entire time of the one hundred twenty-first frame period FP121, and the gate driver 1050 may output all the gate signals GS1, GS2, GS3, etc., GS4, GS5, etc. and GS6 to the first through fourth panel regions PR1 through PR4 in response to the output enable signal OUT_EN. In this manner, the gate driver 1050 may provide the gate signals GS1, GS2, GS3, etc., GS4, GS5, etc. and GS6 to the first, second, third and fourth panel regions PR1, PR2, PR3 and PR4 at frequencies of about 1 Hz, about 120 Hz, about 60 Hz and about 1 Hz, respectively.

In another example, in a case where the gate driver 1050 includes the stage 200*c* of FIG. 10 or the stage 200*d* of FIG. 12, as illustrated in FIG. 14C, the controller 1090 may generate the output enable signal OUT_EN' that has the high level for the entire time of the first frame period FP1, and the gate driver 1050 may output all the gate signals GS1, GS2, GS3, etc., GS4, GS5, etc. and GS6 to the first through fourth panel regions PR1 through PR4 in response to the output enable signal OUT_EN'. In the second frame period FP2, the controller 1090 may generate the output enable signal OUT_EN' that has the high level during the time within the second frame period FP2 allocated to the second panel region PR2, and has the low level during the time within the second frame period FP2 allocated to the first, third and fourth panel regions PR1, PR3 and PR4. In the second frame period FP2, in response to the output enable signal OUT_EN', the gate driver 1050 may output the gate signals GS2, GS3, etc. to the second panel region PR2, but may not output the gate signals GS1, GS4, GS5, etc. and GS6 to the first, third and fourth panel regions PR1, PR3 and PR4. Further, in the third frame period FP3, the controller 1090 may generate the output enable signal OUT_EN' that has the high level during the time within the third frame period FP3 allocated to the second and third panel regions PR2 and PR3, and has the low level during the time within the third frame period FP3 allocated to the first and fourth panel regions PR1 and PR4. In the third frame period FP3, in response to the output enable signal OUT_EN', the gate driver 1050 may output the gate signals GS2, GS3, etc., GS4, GS5, etc. to the second and third panel regions PR2 and PR3, but may not output the gate signals GS1 and GS6 to the first and fourth panel regions PR1 and PR4. Further, in the one hundred twenty-first frame period FP121, the controller 1090 may again generate the output enable signal OUT_EN' that has the high level for the entire time of the one hundred twenty-first frame period FP121, and the gate driver 1050 may output all the gate signals GS1, GS2, GS3, etc., GS4, GS5, etc. and GS6 to the first through fourth panel regions PR1 through PR4 in response to the output enable signal OUT_EN'. In this manner, the gate driver 1050 may provide the gate signals GS1, GS2, GS3, etc., GS4, GS5, etc. and GS6 to the first, second, third and fourth panel regions PR1, PR2, PR3 and PR4 at frequencies of about 1 Hz, about 120 Hz, about 60 Hz and about 1 Hz, respectively.

As described above, the gate driver 1050 and/or the emission driver 1070 according to embodiments may selectively output the gate signals GS and/or the emission signals in response to the output enable signal OUT_EN. Accordingly, the gate driver 1050 and/or the emission driver 1070 according to embodiments may be suitable for the display device 1000 that performs the MFD operation.

Figure 15:
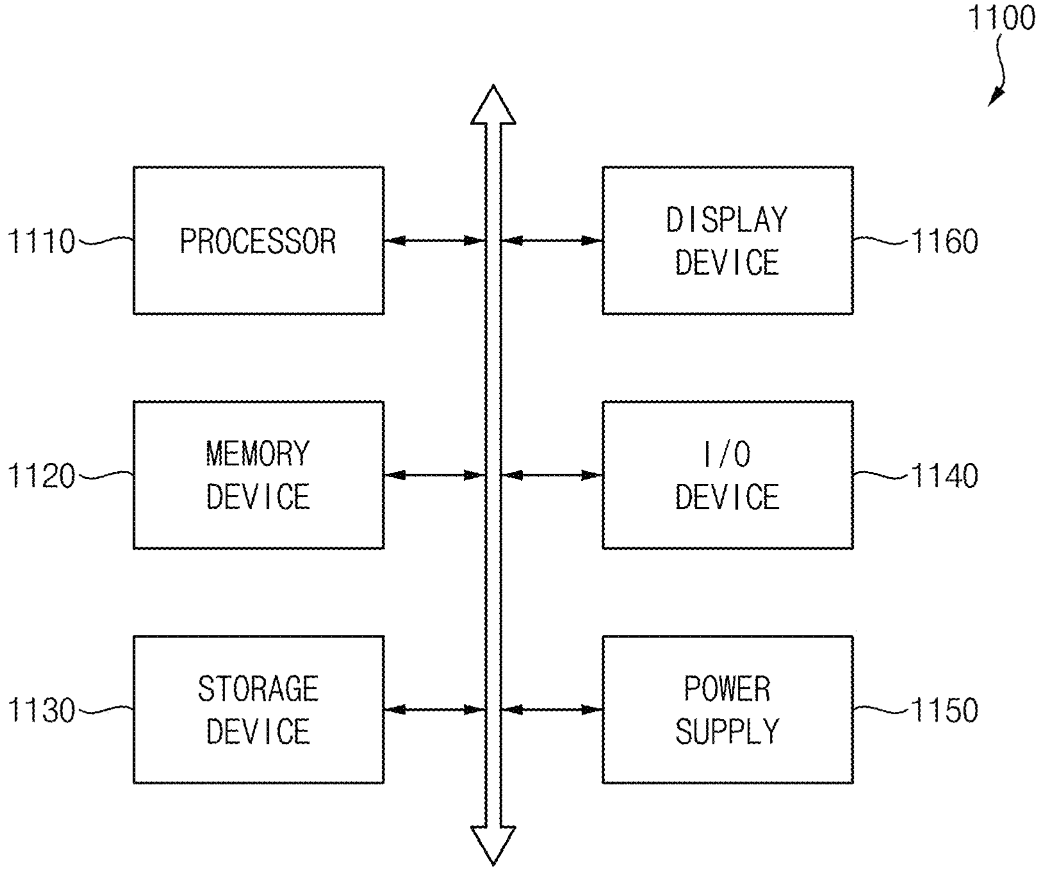
FIG. 15 is a block diagram illustrating an electronic device including a display device according to embodiments.

FIG. 15 is a block diagram illustrating an electronic device 1100 including a display device 1160 according to embodiments.

Referring to FIG. 15, the electronic device 1100 may include a processor 1110, a memory device 1120, a storage device 1130, an input/output (I/O) device 1140, a power supply 1150, and the display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be connected to other components via an address bus, a control bus, a data bus, etc. Further, in some embodiments, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, at least one stage of a driver (e.g., a gate driver and/or an emission driver) may include both of a PMOS transistor and an NMOS transistor. Accordingly, a bootstrapping operation may not be desired or performed in the stage, and power consumption of the driver and the display device 1160 may be reduced. Further, at least one stage of the driver may selectively output an output signal in response to an output enable signal. Accordingly, the driver according to embodiments may be suitable for the display device 1160 that performs a multi-frequency driving (MFD) operation.

The inventive concepts may be applied to any display device 1160, and any electronic device 1100 including the display device 1160. For example, the inventive concepts may be applied to a smart phone, a wearable electronic device, a tablet computer, a mobile phone, a television (TV) (e.g., a digital TV, a 3D TV, etc.), a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A driver including a plurality of stages, at least one stage of the plurality of stages comprising:

an input circuit configured to transfer an input signal to a first node in response to at least one of a clock signal and an inverted clock signal;

a holding capacitor configured to hold a voltage of the first node;

a first inverter configured to generate a voltage of a second node by inverting the voltage of the first node;

a second inverter configured to generate a voltage of a third node by inverting the voltage of the second node;

a third inverter configured to generate a carry signal by inverting the voltage of the second node; and an output control circuit configured to selectively output the voltage of the third node as an output signal in response to an output enable signal, wherein at least one of the first inverter, the second inverter, the third inverter or the output control circuit includes a p-type metal-oxide-semiconductor (PMOS) transistor and an n-type metal-oxide-semiconductor (NMOS) transistor that are connected in series, wherein the at least one stage further comprises:

a PMOS boosting buffer, wherein the voltage of the first node has a low level, and the PMOS boosting buffer is configured to output a low gate voltage to the third node, and wherein the PMOS boosting buffer includes:

a boosting capacitor including a first electrode connected to a carry node at which the carry signal is output, and a second electrode connected to a fourth node;

a seventh PMOS transistor including a gate connected to a line which transfers the low gate voltage, a first terminal connected to the first node, and a second terminal connected to the fourth node; and an eighth PMOS transistor including a gate connected to the fourth node, a first terminal connected to the third node, and a second terminal connected to the line which transfers the low gate voltage.

2. The driver of claim 1, wherein a first active region of the PMOS transistor includes a material different from a material of a second active region of the NMOS transistor.

3. The driver of claim 2, wherein the first active region of the PMOS transistor includes polycrystalline silicon, and wherein the second active region of the NMOS transistor includes an oxide semiconductor, an organic semiconductor or amorphous silicon.

4. The driver of claim 2, wherein the NMOS transistor includes a top gate located above the second active region, and a bottom gate located below the second active region, and wherein the low gate voltage is applied to a terminal of the NMOS transistor, and a second low gate voltage lower than the low gate voltage is applied to the bottom gate of the NMOS transistor.

5. The driver of claim 1, wherein the output control circuit outputs the low gate voltage as the output signal while the output enable signal has a high level, and outputs the voltage of the third node as the output signal while the output enable signal has a low level.

6. The driver of claim 1, wherein the output control circuit includes:

a first PMOS transistor including a gate which receives the output enable signal, a first terminal connected to the third node, and a second terminal connected to an output node at which the output signal is output; and a first NMOS transistor including a gate which receives the output enable signal, a first terminal connected to a line which transfers the low gate voltage, and a second terminal connected to the output node.

7. The driver of claim 1, wherein the input circuit includes at least one of a second PMOS transistor including a gate which receives the inverted clock signal, a first terminal which receives the input signal, and a second terminal connected to the first node, and a second NMOS transistor including a gate which receives the clock signal, a first terminal which receives the input signal, and a second terminal connected to the first node.

8. The driver of claim 1, wherein the holding capacitor includes a first electrode connected to a line which transfers a high gate voltage, and a second electrode connected to the first node.

9. The driver of claim 1, wherein the first inverter includes:

a third PMOS transistor including a gate connected to the first node, a first terminal connected to a line which transfers a high gate voltage, and a second terminal connected to the second node; and a third NMOS transistor including a gate connected to the first node, a first terminal connected to a line which transfers the low gate voltage, and a second terminal connected to the second node.

10. The driver of claim 1, wherein the second inverter includes:

a fourth PMOS transistor including a gate connected to the second node, a first terminal connected to a line which transfers a high gate voltage, and a second terminal connected to the third node; and a fourth NMOS transistor including a gate connected to the second node, a first terminal connected to a line which transfers the low gate voltage, and a second terminal connected to the third node.

11. The driver of claim 1, wherein the third inverter includes:

a fifth PMOS transistor including a gate connected to the second node, a first terminal connected to a line which transfers a high gate voltage, and a second terminal connected to the carry node at which the carry signal is output; and a fifth NMOS transistor including a gate connected to the second node, a first terminal connected to a line which transfers the low gate voltage, and a second terminal connected to the carry node.

12. The driver of claim 1, wherein the at least one stage further comprises:

a sixth PMOS transistor including a gate which receives a global reset signal, a first terminal connected to a line which transfers a high gate voltage, and a second terminal connected to the first node.

13. The driver of claim 1, wherein the output control circuit outputs the voltage of the third node as the output signal while the output enable signal has a high level, and outputs the low gate voltage as the output signal while the output enable signal has a low level.

14. The driver of claim 1, wherein the output control circuit includes:

a first NMOS transistor including a gate which receives the output enable signal, a first terminal connected to the third node, and a second terminal connected to an output node at which the output signal is output; and a first PMOS transistor including a gate which receives the output enable signal, a first terminal connected to a line which transfers the low gate voltage, and a second terminal connected to the output node.

15. A driver including a plurality of stages, at least one stage of the plurality of stages comprising:

a first PMOS transistor including a gate which receives an output enable signal, a first terminal connected to a third node, and a second terminal connected to an output node;

a first NMOS transistor including a gate which receives the output enable signal, a first terminal connected to a line which transfers a low gate voltage, and a second terminal connected to the output node;

a second PMOS transistor including a gate which receives an inverted clock signal, a first terminal which receives an input signal, and a second terminal connected to a first node;

a second NMOS transistor including a gate which receives a clock signal, a first terminal which receives the input signal, and a second terminal connected to the first node;

a holding capacitor including a first electrode connected to a line which transfers a high gate voltage, and a second electrode connected to the first node;

a third PMOS transistor including a gate connected to the first node, a first terminal connected to the line which transfers the high gate voltage, and a second terminal connected to a second node;

a third NMOS transistor including a gate connected to the first node, a first terminal connected to the line which transfers the low gate voltage, and a second terminal connected to the second node;

a fourth PMOS transistor including a gate connected to the second node, a first terminal connected to the line which transfers the high gate voltage, and a second terminal connected to the third node;

a fourth NMOS transistor including a gate connected to the second node, a first terminal connected to the line which transfers the low gate voltage, and a second terminal connected to the third node;

a fifth PMOS transistor including a gate connected to the second node, a first terminal connected to the line which transfers the high gate voltage, and a second terminal connected to a carry node;

a fifth NMOS transistor including a gate connected to the second node, a first terminal connected to the line which transfers the low gate voltage, and a second terminal connected to the carry node;

a sixth PMOS transistor including a gate which receives a global reset signal, a first terminal connected to the line which transfers the high gate voltage, and a second terminal connected to the first node;

a boosting capacitor including a first electrode connected to the carry node, and a second electrode connected to a fourth node;

a seventh PMOS transistor including a gate connected to the line which transfers the low gate voltage, a first terminal connected to the first node, and a second terminal connected to the fourth node; and an eighth PMOS transistor including a gate connected to the fourth node, a first terminal connected to the third node, and a second terminal connected to the line which transfers the low gate voltage.

16. An electronic device comprising:

a processor configured to provide input image data; and a display device configured to receive the input image data from the processor, and to display an image based on the input image data, the display device comprising:

a display panel including a plurality of pixels;

a data driver configured to provide data signals to the plurality of pixels;

a gate driver configured to provide gate signals to the plurality of pixels;

an emission driver configured to provide emission signals to the plurality of pixels; and a controller configured to control the data driver, the gate driver and the emission driver, wherein at least one of the gate driver and the emission driver includes a plurality of stages, and wherein at least one stage of the plurality of stages comprises:

an input circuit configured to transfer an input signal to a first node in response to at least one of a clock signal and an inverted clock signal;

a holding capacitor configured to hold a voltage of the first node;

a first inverter configured to generate a voltage of a second node by inverting the voltage of the first node;

a second inverter configured to generate a voltage of a third node by inverting the voltage of the second node;

a third inverter configured to generate a carry signal by inverting the voltage of the second node; and an output control circuit configured to selectively output the voltage of the third node as an output signal in response to an output enable signal, wherein at least one of the first inverter, the second inverter, the third inverter or the output control circuit includes a p-type metal-oxide-semiconductor (PMOS) transistor and an n-type metal-oxide-semiconductor (NMOS) transistor that are connected in series, wherein the at least one stage further comprises:

a PMOS boosting buffer, wherein the voltage of the first node has a low level, and the PMOS boosting buffer is configured to output a low gate voltage to the third node, and wherein the PMOS boosting buffer includes:

a boosting capacitor including a first electrode connected to a carry node at which the carry signal is output, and a second electrode connected to a fourth node;

a seventh PMOS transistor including a gate connected to a line which transfers the low gate voltage, a first terminal connected to the first node, and a second terminal connected to the fourth node; and an eighth PMOS transistor including a gate connected to the fourth node, a first terminal connected to the third node, and a second terminal connected to the line which transfers the low gate voltage.

17. The electronic device of claim 16, wherein the display panel includes a first panel region driven at a first driving frequency, and a second panel region driven at a second driving frequency lower than the first driving frequency, wherein, in a first frame period, the controller generates the output enable signal having a first level during a first time within the first frame period allocated to the first panel region and a second time within the first frame period allocated to the second panel region such that the plurality of stages outputs output signals to both of the first panel region and the second panel region, and wherein, in a second frame period, the controller generates the output enable signal having the first level during a third time within the second frame period allocated to the first panel region and a second level different from the first level during a fourth time within the second frame period allocated to the second panel region such that the plurality of stages outputs the output signals to the first panel region and does not output the output signals to the second panel region.

* * * * *